US012374313B2

(12) United States Patent
Hall

(10) Patent No.: US 12,374,313 B2
(45) Date of Patent: Jul. 29, 2025

(54) MUSICAL INSTRUMENT TUNING SYSTEM

(71) Applicant: Joshua P. Hall, Prarie Grove, AR (US)

(72) Inventor: Joshua P. Hall, Prarie Grove, AR (US)

( * ) Notice: Subject to any disclaimer, the term of this patent is extended or adjusted under 35 U.S.C. 154(b) by 318 days.

(21) Appl. No.: 18/122,913

(22) Filed: Mar. 17, 2023

(65) Prior Publication Data

US 2024/0312439 A1 Sep. 19, 2024

(51) Int. Cl.
*G10G 7/02* (2006.01)

(52) U.S. Cl.
CPC ...................................... *G10G 7/02* (2013.01)

(58) Field of Classification Search
CPC .. G10G 1/00; G10G 7/02; G10D 3/14; G10D 3/137
See application file for complete search history.

(56) References Cited

U.S. PATENT DOCUMENTS

| | | | | |
|---|---|---|---|---|
| 2,221,523 | A | 11/1940 | Railsback | |
| 2,679,782 | A | 6/1954 | Ryder | |
| 3,968,719 | A | 7/1976 | Sanderson | 84/454 |
| 4,038,899 | A | 8/1977 | MacMillan | 84/454 |
| 5,877,443 | A | 3/1999 | Arends et al. | 84/454 |

FOREIGN PATENT DOCUMENTS

| | | | |
|---|---|---|---|
| CN | 107146597 | * | 8/2017 |

* cited by examiner

*Primary Examiner* — Kimberly R Lockett
(74) *Attorney, Agent, or Firm* — Keisling & Pieper PLC; David B. Pieper; Trent C. Keisling

(57) ABSTRACT

A tuning method for a musical instrument that is offset from an equal temperament diatomic octave tuning following a fibration spiral positioned using a fibratio inflection note and a fibratio neutral crossing note for sharp adjustment at frequencies above the fibratio inflection note and flat adjustment below the fibratio inflection note.

6 Claims, 14 Drawing Sheets

Equal-Temerature Tuning

Firatio 440 Tuning

Fender step/straight segment tuning

Piano Firatio Curve Tuning

Firatio Tuning

Firatio Tuning

Firatio 440 Multiple Instrument Tuning

MUSICAL INSTRUMENT TUNING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in tuning musical instruments. More particularly, the invention relates to improvements particularly suited for providing multiple instrument coordination and harmonics. In particular, the present invention relates specifically to a revised tuning system applicable across multiple instruments for band harmonies.

2. Description of the Known Art

As will be appreciated by those skilled in the art, musical instruments are known in various forms. Patents disclosing information relevant to tuning musical instruments include: U.S. Pat. No. 2,221,523 issued on Nov. 12, 1940 to Railsback entitled Pitch Determining Apparatus; U.S. Pat. No. 2,679,782, issued on Jun. 1, 1956 to Ryder entitled Tuning Instrument; U.S. Pat. No. 3,968,719, issued to Sanderson on Jul. 13, 1976 entitled Method For Tuning Musical Instruments; U.S. Pat. No. 4,038,899, issued on Aug. 2, 1977 to Macmillan entitled Musical Instrument Tuning Apparatus; and U.S. Pat. No. 5,877,443, issued on Mar. 2, 1999 to Arends entitled Strobe Tuner. Each of these patents is hereby expressly incorporated by reference in their entirety.

Tuning

For most instruments, the user tunes an instrument by turning pegs to change the tension of the string, adjusts the length of wind instruments, or by changing the tension of the drum head. Big instruments with multiple harmonic variables such as the piano or organ present a unique situation and have to be tuned by people who are specialists in tuning. During the course of music history there have been several systems of doing this. These different tuning systems are all about the exact scientific relationship between the notes of the scale. There has been an enormous amount of discussion among musicians about how best to tune instruments. Regardless of the system, there is a constant problem that forces compromises known since the time of Pythagoras.

To understand this problem, we begin with an understanding of basic tuning. In traditional western music, the diatonic scale is used C-D-E-F-G-A-B which then starts again at C for the next octave. Two notes are defined as "octave apart" when the higher note is vibrating at twice the speed of the lower note. For example: Middle C, known as C4, is 261.63 Hz versus 523.26 HZ for C5, the note one octave higher. Thirds, Fourths, Fifths, etc. . . . are also well defined. For example, a note at 1½ times the frequency of the basic note will be a perfect fifth higher. If one tunes a C, then tunes a G so that it is exactly 1½ times the frequency of the C, they can continue tuning in fifth up the octaves (a D, then an A etc.) until we should arrive back at C but octaves higher. However, for mathematical masons, the higher C is not in tune with the first C. This was discovered by Pythagoras and is called "the comma of Pythagoras". The Pythagorean comma can also be thought of as the discrepancy between twelve justly tuned perfect fifths (ratio 3:2) and seven octaves (ratio 2:1) or 1.0136432647705078125. This interval has serious implications for the various tuning schemes of the chromatic scale, because in Western music, 12 perfect fifths and seven octaves are treated as the same interval.

Musical tuning systems throughout the centuries have tried to find ways of dealing with the Pythagorean comma problem. From the 16th century onwards several music theorists wrote long books about the best way to tune keyboard instruments. They often started by tuning up a fifth and down a fifth so that these notes were perfectly in tune (e.g. C, G and F), then they would continue (tuning the D to the G and B flat to the F) until they met in the middle around F sharp. Sometimes old organs today are tuned by such a method. Playing in keys with very few sharps or flats (such as C, G or F) sounds very beautiful, but playing in keys with lots of sharps or flats sounds horribly out of tune.

Here are some of the main ways of tuning the twelve-note chromatic scale which have been developed in order to get round the problem that an instrument cannot be tuned so that all intervals are "perfect":

1) Just Intonation

The ratios of the frequencies between all notes are based on whole numbers with relatively low prime factors, such as 3:2, 5:4, 7:4, or 64:45; or in which all pitches are based on the harmonic series, which are all whole number multiples of a single tone. Such a system can be used on instruments such as lutes, but not on keyboard instruments.

2) Pythagorean Tuning

A type of just intonation in which the ratios of the frequencies between all notes are all based on powers of 2 and 3.

3) Meantone Temperament

A system of tuning which averages out pairs of ratios used for the same interval (such as 9:8 and 10:9), thus making it possible to tune keyboard instruments.

4) Well Temperament

Any one of a number of systems where the ratios between intervals are not equal to, but approximate to, ratios used in just intonation.

5) Equal Temperament (a Special Case of Well-Temperament)

FIG. 1*a* shows the graphed notes of the equal temperament scale which are all separated by logarithmically equal distances, which are integer powers of 2 ($1/12$). Twelve-tone equal temperament divides the octave into 12 parts, all of which are equal on a logarithmic scale, with a ratio equal to the 12th root of 2 ($12\sqrt{2}\approx1.05946$). This is also known as 12 equal temperament, 12-TET or 12-ET; informally abbreviated to twelve equal. Equal temperament is the most common tuning system used in the West. This system reconciles the Pythagorean comma by flattening each fifth by a twelfth of a Pythagorean comma (approximately 2 cents), thus producing perfect octaves. These tunings are as follows:

Standard equal temperament tuning (ET) of the range of frequencies for a diatonic scale piano uses the following frequencies:

TABLE 0

Diatonic Equal Temperament Tuning Frequencies

| Key number | Helmholtz Name | Scientific Name | Frequency (Hz) |
|---|---|---|---|
| 1 | A'' sub-contraoctave | A0 Double Pedal A | 27.5000 |
| 2 | A♯''/B♭'' | A♯0/B♭0 | 29.1352 |
| 3 | B'' | B0 | 30.8677 |
| 4 | C' contraoctave | C1 Pedal C | 32.7032 |
| 5 | C♯'/D♭' | C♯1/D♭1 | 34.6478 |
| 6 | D' | D1 | 36.7081 |
| 7 | D♯'/E♭' | D♯1/E♭1 | 38.8909 |
| 8 | E' | E1 | 41.2034 |
| 9 | F' | F1 | 43.6535 |
| 10 | F♯'/G♭' | F♯1/G♭1 | 46.2493 |
| 11 | G' | G1 | 48.9994 |
| 12 | G♯'/A♭' | G♯1/A♭1 | 51.9131 |
| 13 | A' | A1 | 55.0000 |
| 14 | A♯'/B♭' | A♯1/B♭1 | 58.2705 |
| 15 | B' | B1 | 61.7354 |
| 16 | C great octave | C2 Deep C | 65.4064 |
| 17 | C♯/D♭ | C♯2/D♭2 | 69.2957 |
| 18 | D | D2 | 73.4162 |
| 19 | D♯/E♭ | D♯2/E♭2 | 77.7817 |
| 20 | E | E2 | 82.4069 |
| 21 | F | F2 | 87.3071 |
| 22 | F♯/G♭ | F♯2/G♭2 | 92.4986 |
| 23 | G | G2 | 97.9989 |
| 24 | G♯/A♭ | G♯2/A♭2 | 103.8260 |
| 25 | A | A2 | 110.0000 |
| 26 | A♯/B♭ | A♯2/B♭2 | 116.5410 |
| 27 | B | B2 | 123.4710 |
| 28 | c small octave | C3 Low C | 130.8130 |
| 29 | c♯/d♭ | C♯3/D♭3 | 138.5910 |
| 30 | d | D3 | 146.8320 |
| 31 | d♯/e♭ | D♯3/E♭3 | 155.5630 |
| 32 | e | E3 | 164.8140 |
| 33 | | F3 | 174.6140 |
| 34 | f♯/g♭ | F♯3/G♭3 | 184.9970 |
| 35 | g | G3 | 195.9980 |
| 36 | g♯/a♭ | G♯3/A♭3 | 207.6520 |
| 37 | a | A3 | 220.0000 |
| 38 | a♯/b♭ | A♯3/B♭3 | 233.0820 |
| 39 | b | B3 | 246.9420 |
| 40 | c' 1-line octave | C4 Middle C | 261.6260 |
| 41 | c♯'/d♭' | C♯4/D♭4 | 277.1830 |
| 42 | d' | D4 | 293.6650 |
| 43 | d♯'/e♭' | D♯4/E♭4 | 311.1270 |
| 44 | e' | E4 | 329.6280 |
| 45 | f' | F4 | 349.2280 |
| 46 | f♯'/g♭' | F♯4/G♭4 | 369.9940 |
| 47 | g' | G4 | 391.9950 |
| 48 | g♯'/a♭' | G♯4/A♭4 | 415.3050 |
| 49 | a' | A4 A440 | 440.0000 |
| 50 | a♯'/b♭' | A♯4/B♭4 | 466.1640 |
| 51 | b' | B4 | 493.8830 |
| 52 | c'' 2-line octave | C5 Tenor C | 523.2510 |
| 53 | c♯''/d♭'' | C♯5/D♭5 | 554.3650 |
| 54 | d'' | D5 | 587.3300 |
| 55 | d♯''/e♭'' | D♯5/E♭5 | 622.2540 |
| 56 | e'' | E5 | 659.2550 |
| 57 | f'' | F5 | 698.4560 |

TABLE 0-continued

Diatonic Equal Temperament Tuning Frequencies

| Key number | Helmholtz Name | Scientific Name | Frequency (Hz) |
|---|---|---|---|
| 58 | f♯''/g♭'' | F♯5/G♭5 | 739.9890 |
| 59 | g'' | G5 | 783.9910. |
| 60 | g♯''/a♭'' | G♯5/A♭5 | 830.6090 |
| 61 | a'' | A5 | 880.0000 |
| 62 | a♯''/b♭'' | A♯5/B♭5 | 932.3280 |
| 63 | b'' | B5 | 987.7670 |
| 64 | c''' 3-line octave | C6 Soprano C (High C) | 1046.5000 |
| 65 | c♯'''/d♭''' | C♯6/D♭6 | 1108.7300 |
| 66 | d''' | D6 | 1174.6600 |
| 67 | d♯'''/e♭''' | D♯6/E♭6 | 1244.5100 |
| 68 | e''' | E6 | 1318.5100 |
| 69 | f''' | F6 | 1396.9100 |
| 70 | f♯'''/g♭''' | F♯6/G♭6 | 1479.9800 |
| 71 | g''' | G6 | 1567.9800 |
| 72 | g♯'''/a♭''' | G♯6/A♭6 | 1661.2200 |
| 73 | a''' | A6 | 1760.0000 |
| 74 | a♯'''/b♭''' | A♯6/B♭6 | 1864.6600 |
| 75 | b''' | B6 | 1975.5300 |
| 76 | c'''' 4-line octave | C7 Double high C | 2093.0000 |
| 77 | c♯''''/d♭'''' | C♯7/D♭7 | 2217.4600 |
| 78 | d'''' | D7 | 2349.3200 |
| 79 | d♯''''/e♭'''' | D♯7/E♭7 | 2489.0200 |
| 80 | e'''' | E7 | 2637.0200 |
| 81 | f'''' | F7 | 2793.8300 |
| 82 | f♯''''/g♭'''' | F♯7/G♭7 | 2959.9600 |
| 83 | g'''' | G7 | 3135.9600 |
| 84 | g♯''''/a♭'''' | G♯7/A♭7 | 3322.4400 |
| 85 | a'''' | A7 | 3520.0000 |
| 86 | a♯''''/b♭'''' | A♯7/B♭7 | 3729.3100 |
| 87 | b'''' | B7 | 3951.0700 |
| 88 | c''''' 5-line octave | C8 Eighth octave | 4186.0100 |

FIG. 1*a* is a graph of a PRIOR ART Diatonic Equal-Temperament Tuning with notes along the horizontal and against offset Cents variation from ideal equal temperament on the vertical. All of the graphs presented herein will use this same style with notes on the horizontal and offset cents on the vertical standard to facilitate an understanding of the invention. The cent is a logarithmic unit of measure used for musical intervals. Twelve-tone equal temperament divides the octave into 12 semitones of 100 cents each. Typically, cents are used to express small intervals, or to compare the sizes of comparable intervals in different tuning systems. This equal temperament tuning, and all of the other currently known tuning systems, have limitations which creates problems in "live" sound environments.

One problem is specifically found in pianos because they have an inharmonicity in the strings. To cure this inharmonicity, piano tuners will "stretch" the tunings set around middle C (C4) on the piano. One type of stretch is known as a Railsback curve. An electric Fender Rhodes piano uses this type of tuning and this which may be seen in FIG. 2*b*. To produce octaves that reflect the temperament and accommodate the inharmonicity of the instrument, the tuner begins the stretch from the middle of the piano C4 so that, as the stretch accumulates from register to register, it results in the desired stretch at the top and bottom of the instrument. This places the inflection point of a Railsback curve at C4 and tunes C4 flat by 2 cents. The flat to sharp crossing point is set at C5. A comparison and contrast to this will be presented in the detailed description below.

Mathematics

On a different subject of mathematic ideas, we have the golden ratio and the Fibonacci sequence. In mathematics, two quantities are in the golden ratio if their ratio is the same as the ratio of their sum to the larger of the two quantities, (the ratio is a numeric value 1.618033988749 . . . ). Fibonacci numbers are found where each number is the sum of the two preceding ones in a sequence. These Fibonacci numbers form the Fibonacci sequence. Fibonacci started the sequence with 0 and 1, so that the first few values in the sequence are: 0, 1, 1, 2, 3, 5, 8, 13, 21, 34, 55, 89, 144 . . . . When graphed, these form a Fibonacci spiral that is an approximation of the golden spiral created by drawing circular arcs connecting the opposite corners of squares in the Fibonacci tiling. A golden spiral is a logarithmic spiral whose growth factor is φ, the golden ratio (That is, a golden spiral gets wider (or further from its origin) by a factor of φ for every quarter turn it makes.

From these prior references it may be seen that these prior art patents are very limited in their teaching and utilization, and an improved musical instrument tuning is needed to overcome these limitations. Thus, the present application notes the limitations in these prior art tuning systems and presents a solution with a new unique tuning method and result.

SUMMARY OF THE INVENTION

The present invention is directed to an improved musical instrument tuning. In accordance with one exemplary embodiment of the present invention, the present invention teaches a fibratio tuning system for single and multiple instrument performances using the logarithmic spacing of equal temperament combined with both the golden ratio and the Fibonacci sequence to change away from the linear logarithmic mapping of equal temperament to form a fibratio curve of sharps and flats in a fibratio spiral positioned at an inflection note to adjust above and below a chosen sharp and flat neutral intercept.

An octave system is utilized for compatibility with standard playing. Octave changes are adjusted using a Fibonacci sequence multiplied by the golden ratio. This combination of the golden ratio and the Fibonacci sequence is converted to get a decimal form to tune with sharps or flats from equal temperament to achieve the fibratio tuning curve with a neutral intercept A2. Finally, the entire fibratio tuning curve is shifted to adjust to a 440 Hz inflection point.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

As shown in FIGS. 1-6 of the drawings, one exemplary embodiment of the present invention is generally shown as a Fibratio Tuning System. We can begin by understanding how to tune a piano with this system.

Figure 1A:
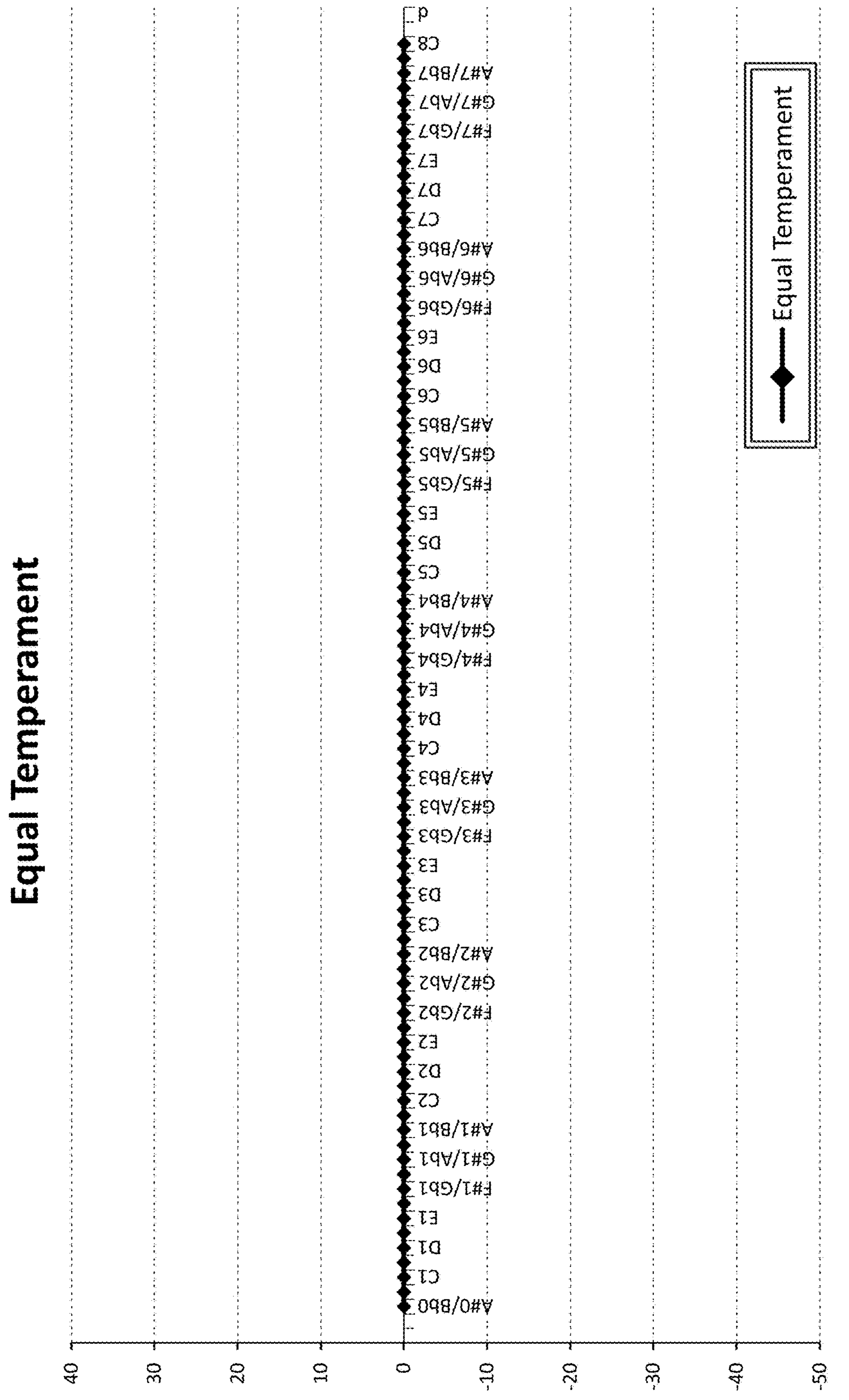
Figure 1a (PRIOR ART)
FIG. 1*a* is a graph of a PRIOR ART Equal-Temperament Tuning.
Figure 1B:
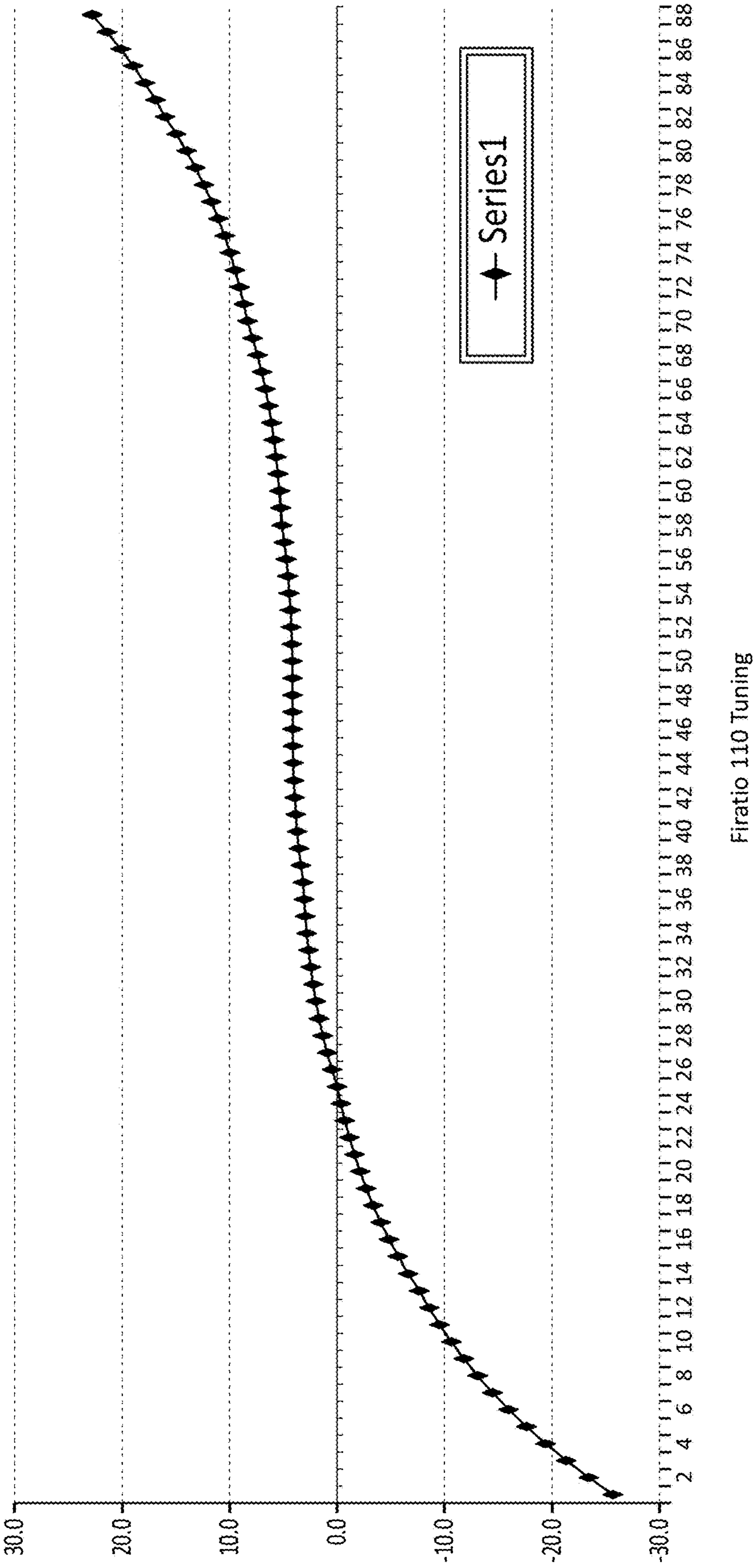
FIG. 1*b* is a graph of a Fibratio 110 Tuning.
Figure 1C:
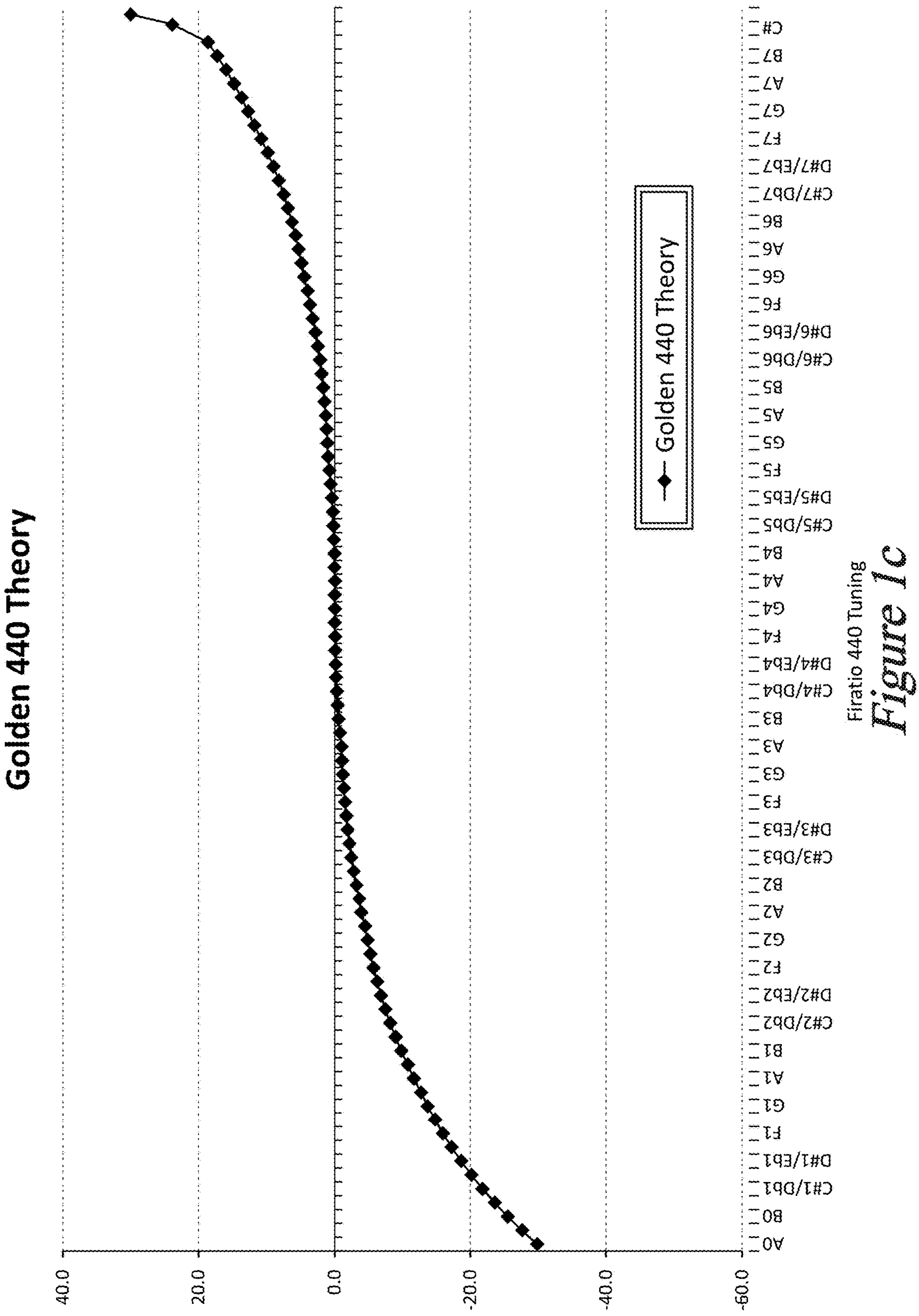
FIG. 1*c* is a graph of a Fibratio 440 Tuning.

Piano Tuning with A2 110 Hz Inflection Point:

FIG. 1 shows the changes to be implemented by the fibratio tuning system. FIG. 1*a* shows the prior art Equal Temperament tuning based on a C4 starting point with each tuning being neutral or neither sharp nor flat. FIG. 1*b* shows the change from flat tuning to curved fibratio tuning (Fibratio 110) using the fibration curve and using 110 Hz frequency as the neutral intercept crossing point and a 440 Hz inflection point. Finally, FIG. 1*c* shows the Fibratio 440 tuning where 440 Hz is both the inflection point and the neutral intercept crossing point on the fibratio curve. We can understand how this tuning is implemented by beginning with the change from the flat equal temperament tuning to the fibratio curve for Fibratio 110 tuning having a concave downward shape for frequencies below the 440 Hz inflection point and a concave upward shape for frequencies above the inflection point.

For the first example of FIG. 1*b*, we will use 110 Hz commonly referred to as the note A2 or A110 for our neutral crossing point. Thus, A2 will be assigned its neutral or common equal temperament value of 110 Hz and the scaling will be applied around this neutral point. Here we can consider one whole step (two half steps) step down to G2 to understand the difference between equal temperament tuning and fibratio tuning.

Step one: Begin with the Golden Ratio in numeric value:

Golden Ratio=GR=1.618033988749

Step two: Assign the Fibonacci sequence numbers to the octaves to get a Fibonacci octave number. We will begin with the lowest octave on a piano and assign it as the starting number of 1 in the Fibonacci sequence. Each octave above this will be assigned the next Fibonacci sequence number. Thus, the second octave is assigned a 2 and then the third octave is assigned a 3 and the fourth octave is assigned a 5, the fifth octave is assigned an 8 and so on. This is shown in Table 1:

TABLE 1

Assigned Fibonacci Number (AFN)

| Octave | Assigned Fibonacci Number |
|---|---|
| 1 | 1 |
| 2 | 2 |
| 3 | 3 |
| 4 | 5 |
| 5 | 8 |
| 6 | 13 |
| 7 | 21 |
| 8 | 34 |
| 9 | 55 |

Step three: Combine the Golden Ratio and the Assigned Fibonacci number and scale it to a decimal. The Golden Ratio GR is multiplied by the Fibonacci number AFN of the octave and then this is divided by 20 to scale it for a decimal form.

$$\text{Change per octave} = CO = GR * AFN/20$$

The results can be understood from the following table:

TABLE 2

| Golden Ratio (GR) | Fibonacci Numbers (AFN) | Change Per Octave (CO) |
|---|---|---|
| 1.618 | 1 | 0.0809 |
| | 2 | 0.1618 |
| | 3 | 0.2427 |
| | 5 | 0.4045 |
| | 8 | 0.6472 |
| | 13 | 1.0517 |
| | 21 | 1.6989 |
| | 34 | 2.7506 |
| | 55 | 4.4495 |

Now that we know a change per octave, we can calculate out a change per octave note. Because there are 12 notes per octave, we can simply divide by 12:

$$\text{Change per note} = CON = CO/12$$

This can be understood by the following table:

TABLE 3

| "A" Octaves | | | Change over octave CO | Change per octave note CON |
|---|---|---|---|---|
| A0 | 13.75 | 27.5 | 0.0809 | 0.0067 |
| A1 | 27.5 | 55 | 0.1618 | 0.0135 |
| A2 | 55 | 110 | 0.2427 | 0.0202 |
| A3 | 110 | 220 | 0.4045 | 0.0337 |
| A4 | 220 | 440 | 0.6472 | 0.0539 |
| A5 | 440 | 880 | 1.0517 | 0.0876 |
| A6 | 880 | 1760 | 1.6989 | 0.1416 |
| A7 | 1760 | 3520 | 2.7506 | 0.2292 |
| A8 | 3520 | 7040 | 4.4495 | 0.3708 |

With a change per octave note calculated, we can now use this to tune an instrument.

As a baseline for tuning, we can use equal temperament tuning to understand the new fibratio tuning. For nomenclature in this comparison, we will refer to equal temperament tuned notes as ET notes and fibratio tuned notes as FN notes. Thus, ETA2 is the Equal Temperament note with a standard A2, 110 Hz tuning. For this fibratio tuning example, we are using ETA4 as our inflection point and ETA2 as our neutral crossing point of flats and sharps. Thus, with ETA4 as our inflection point, we will add for notes with a higher frequency and subtract for notes with a lower frequency. Also, with the neutral crossing FNC set to the same frequency of 110 Hz its nomenclature will be FNA2 but it will have no cents adjustment from the equal temperament note. In this manner, both the inflection note and the neutral crossing note may be set. For every other note, we adjust the tuning up or down for each octave and each half step within a n octave as we move in a direction away from the inflection note FNA4. Each octave move will use the change per octave from the table above, similarly each change within a given octave will use the change per octave note from the table above. Thus, we use the following conversion formula:

For any selected Fibratio note $$Y \text{ (using an } A440 \text{ inflection and } A110 \text{ as neutral)} =$$

$$FNY(110) = (ETY\text{ Hz}) + (\text{Change over full octaves } CO) +$$

$$(\text{number of half step differences from octave base}) *$$

$$(\text{octave } CN)) = \text{Hz (for note } FNY)$$

In this example, with the neutral set at FNA2=ETA2, the note ETA2 # has an equal temperament frequency of 116.5410 Hz, ETA2 # is within the first octave adjacent to ETA2 such that no octave adjustment is needed, and ETA2 # is one half step up from ETA2 which places it in the change to the ETA3 octave with (From Table 3 above) a change per note of 0.0337. So we simply multiple the number of steps (1) against the octave CN 0.0337) and add that to the equal temperament frequency.

Fibratio $A2\#$ (cross $A110$) =

$$FNA2\#(110) = (ETA2\#) + (((\text{Change over full octaves } CO) +$$

$$(\text{number of half step differences from octave base}) * (\text{octave } CN)) =$$

$$116.5410\text{ Hz} + (0 + (1) * 0.0337)) = 116.5747\text{ Hz}$$

Thus, Fibratio A2 #(crossing A110)=116.5747 Hz. To continue with this example, we can go up two half steps from ETA2 to convert ETB2 to FNB2:

Fibratio $B2$ (inflection $A110$) =

$$FNB2(110) = 123.4710 + (0 + (2 * 0.0337)) = 123.5384\text{ Hz}$$

Thus, Fibratio B2(110)=123.5384 Hz. This continues through the twelve notes of the A3 octave until at A4 where we change into the next octave. This jump to the next octave requires an octave adjustment, resets the octave base for counting half steps, and resets the number of half notes to zero. Per the previous discussion, the CN conversion number for the next octave from ETA3 is now 0.4045. Thus, we can calculate using the formula:

Fibratio $A3$ (base $A110$) =

$$FNA3(110) = 220 + (0.04045 + (0 * 0.0539) = 220.4045\text{ Hz}$$

Thus, Fibratio A3 (110)=220.4045 Hz.

Then for FNA3 #:

Fibratio $A3\#$ (cross $A110$) =

$$FNA3\#(110) = (ETA3\#) + (((\text{Change over full octaves } CO) +$$

$$(\text{number of half step differences from octave base}) * (\text{octave } CN)) =$$

$$233.0820\text{ Hz} + (0.04045 + (1) * 0.0539)) = 233.5404\text{ Hz}.$$

The following table outlines the conversions for a piano keyboard (ETA4 Inflection Note, and ETA2 crossing point). ETA2 was initially chosen because this is where the initial discrepancies in harmonics was heard as the most prominent:

TABLE 4

| Standard Hertz Piano Notes Note | Key number | Frequency (Hz) | Fibratio Piano Notes (110) Hertz Difference from Standard | Fibratio Cents Offset | New Open |
|---|---|---|---|---|---|
| A0 | 1 | 27.5000 | −0.4045 | −25.65401863 | 27.0955 |
| A#0/Bb0 | | 29.1352 | −0.391016667 | −23.39180644 | 28.74418333 |
| B0 | 3 | 30.8677 | −0.377533333 | −21.30474364 | 30.49016667 |
| C1 | 4 | 32.7032 | −0.36405 | −19.38006044 | 32.33915 |
| C#1/Db1 | | 34.6478 | −0.350566667 | −17.60585646 | 34.29723333 |
| D1 | 6 | 36.7081 | −0.337083333 | −15.97102727 | 36.37101667 |
| D#1/Eb1 | | 38.8909 | −0.3236 | −14.46536577 | 38.5673 |
| E1 | 8 | 41.2034 | −0.310116667 | −13.07938553 | 40.89328333 |
| F1 | 9 | 43.6535 | −0.296633333 | −11.80419612 | 43.35686667 |
| F#1/Gb1 | | 46.2493 | −0.28315 | −10.6316341 | 45.96615 |
| G1 | 11 | 48.9994 | −0.269666667 | −9.554107034 | 48.72973333 |
| G#1/Ab1 | | 51.9131 | −0.256183333 | −8.564529161 | 51.65691667 |
| A1 | 13 | 55.0000 | −0.2427 | −7.656368889 | 54.7573 |
| A#1/Bb1 | | 58.2705 | −0.222475 | −6.622449257 | 58.048025 |
| B1 | 15 | 61.7354 | −0.20225 | −5.680968919 | 61.53315 |
| C2 | 16 | 65.4064 | −0.182025 | −4.824714264 | 65.224375 |
| C#2/Db2 | | 69.2957 | −0.1618 | −4.047021688 | 69.1339 |
| D2 | 18 | 73.4162 | −0.141575 | −3.341715974 | 73.274625 |
| D#2/Eb2 | | 77.7817 | −0.12135 | −2.703069016 | 77.66035 |
| E2 | 20 | 82.4069 | −0.101125 | −2.125775265 | 82.305775 |
| F2 | 21 | 87.3071 | −0.0809 | −1.604929771 | 87.2262 |
| F#2/Gb2 | | 92.4986 | −0.060675 | −1.135985763 | 92.437925 |
| G2 | 23 | 97.9989 | −0.04045 | −0.714731224 | 97.95845 |
| G#2/Ab2 | | 103.8260 | −0.020225 | −0.337272161 | 103.805775 |
| A2 | 25 | 110.0000 | 0 | 0 | 110 |
| A#2/Bb2 | | 116.5410 | 0.033708333 | 0.500669948 | 116.5747083 |
| B2 | 27 | 123.4710 | 0.067416667 | 0.94501686 | 123.5384167 |
| C3 | 28 | 130.8130 | 0.101125 | 1.337813587 | 130.914125 |
| C#3/Db3 | | 138.5910 | 0.134833333 | 1.683475707 | 138.7258333 |
| D3 | 30 | 146.8320 | 0.168541667 | 1.986063915 | 147.0005417 |
| D#3/Eb3 | | 155.5630 | 0.20225 | 2.249343808 | 155.76525 |
| E3 | 32 | 164.8140 | 0.235958333 | 2.476773592 | 165.0499583 |
| F3 | 33 | 174.6140 | 0.269666667 | 2.671584119 | 174.8836667 |
| F#3/Gb3 | | 184.9970 | 0.303375 | 2.836710615 | 185.300375 |
| G3 | 35 | 195.9980 | 0.337083333 | 2.974871671 | 196.3350833 |
| G#3/Ab3 | | 207.6520 | 0.370791667 | 3.088603599 | 208.0227917 |
| A3 | 37 | 220.0000 | 0.4045 | 3.180187168 | 220.4045 |
| A#3/Bb3 | | 233.0820 | 0.458433333 | 3.401703795 | 233.5404333 |
| B3 | 39 | 246.9420 | 0.512366667 | 3.588323039 | 247.4543667 |
| C4 | 40 | 261.6260 | 0.5663 | 3.743275956 | 262.1923 |
| C#4/Db4 | | 277.1830 | 0.620233333 | 3.869535666 | 277.8032333 |
| D4 | 42 | 293.6650 | 0.674166667 | 3.969838534 | 294.3391667 |
| D#4/Eb4 | | 311.1270 | 0.7281 | 4.046704023 | 311.8551 |
| E4 | 44 | 329.6280 | 0.782033333 | 4.102440464 | 330.4100333 |
| F4 | 45 | 349.2280 | 0.835966667 | 4.139199978 | 350.0639667 |
| F#4/Gb4 | | 369.9940 | 0.8899 | 4.158919901 | 370.8839 |
| G4 | 47 | 391.9950 | 0.943833333 | 4.163401096 | 392.9388333 |
| G#4/Ab4 | | 415.3050 | 0.997766667 | 4.15428649 | 416.3027667 |
| A4 | 49 | 440.0000 | 1.0517 | 4.133105274 | 441.0517 |
| A#4/Bb4 | | 466.1640 | 1.139341667 | 4.226110499 | 467.3033417 |
| B4 | 51 | 493.8830 | 1.226983333 | 4.295675399 | 495.1099833 |
| C5 | 52 | 523.2510 | 1.314625 | 4.344127974 | 524.565625 |
| C#5/Db5 | | 554.3650 | 1.402266667 | 4.373628554 | 555.7672667 |
| D5 | 54 | 587.3300 | 1.489908333 | 4.386143974 | 588.8199083 |
| D#5/Eb5 | | 622.2540 | 1.57755 | 4.383502775 | 623.83155 |
| E5 | 56 | 659.2550 | 1.665191667 | 4.367356785 | 660.9201917 |
| F5 | 57 | 698.4560 | 1.752833333 | 4.339233053 | 700.2088333 |
| F#5/Gb5 | | 739.9890 | 1.840475 | 4.300519502 | 741.829475 |
| G5 | 59 | 783.9910 | 1.928116667 | 4.252501932 | 785.9191167 |
| G#5/Ab5 | | 830.6090 | 2.015758333 | 4.196344804 | 832.6247583 |
| A5 | 61 | 880.0000 | 2.1034 | 4.133105274 | 882.1034 |
| A#5/Bb5 | | 932.3280 | 2.244975 | 4.163669187 | 934.572975 |
| B5 | 63 | 987.7670 | 2.38655 | 4.177800392 | 990.15355 |
| C6 | 64 | 1046.5000 | 2.528125 | 4.17725551 | 1049.028125 |
| C#6/Db6 | | 1108.7300 | 2.6697 | 4.163610593 | 1111.3997 |
| D6 | 66 | 1174.6600 | 2.811275 | 4.138355176 | 1177.471275 |
| D#6/Eb6 | | 1244.5100 | 2.95285 | 4.102835113 | 1247.46285 |

TABLE 4-continued

| Standard Hertz Piano Notes Note | Key number | Frequency (Hz) | Fibratio Piano Notes (110) Hertz Difference from Standard | Fibratio Cents Offset | New Open |
|---|---|---|---|---|---|
| E6 | 68 | 1318.5100 | 3.094425 | 4.058291053 | 1321.604425 |
| F6 | 69 | 1396.9100 | 3.236 | 4.005837482 | 1400.146 |
| F#6/Gb6 | | 1479.9800 | 3.377575 | 3.946479419 | 1483.357575 |
| G6 | 71 | 1567.9800 | 3.51915 | 3.88120103 | 1571.49915 |
| G#6/Ab6 | | 1661.2200 | 3.660725 | 3.81081323 | 1664.880725 |
| A6 | 73 | 1760.0000 | 3.8023 | 3.736119804 | 1763.8023 |
| A#6/Bb6 | | 1864.6600 | 4.031516667 | 3.739000522 | 1868.691517 |
| B6 | 75 | 1975.5300 | 4.260733333 | 3.729826212 | 1979.790733 |
| C7 | 76 | 2093.0000 | 4.48995 | 3.709903799 | 2097.48995 |
| C#7/Db7 | | 2217.4600 | 4.719166667 | 3.680472573 | 2222.179167 |
| D7 | 78 | 2349.3200 | 4.948383333 | 3.64267116 | 2354.268383 |
| D#7/Eb7 | | 2489.0200 | 5.1776 | 3.597531297 | 2494.1976 |
| E7 | 80 | 2637.0200 | 5.406816667 | 3.546003476 | 2642.426817 |
| F7 | 81 | 2793.8300 | 5.636033333 | 3.488925332 | 2799.466033 |
| F#7/Gb7 | | 2959.9600 | 5.86525 | 3.427098146 | 2965.82525 |
| G7 | 83 | 3135.9600 | 6.094466667 | 3.361238358 | 3142.054467 |
| G#7/Ab7 | | 3322.4400 | 6.323683333 | 3.29196931 | 3328.763683 |
| A7 | 85 | 3520.0000 | 6.5529 | 3.219902563 | 3526.5529 |
| A#7/Bb7 | | 3729.3100 | 6.923691667 | 3.211161756 | 3736.233692 |
| B7 | 87 | 3951.0700 | 7.294483333 | 3.19326534 | 3958.364483 |
| C8 | 88 | 4186.0100 | 7.665275 | 3.167276178 | 4193.675275 |

By this system, we are based around the distance from 110 Hz such that the distance has primary control and not the octaves. Thus, fibratio tuning provides a completely different sound from the known equal temperament.

The A2 110 hz basis solved the harmonics problems with other instruments at that range, but an improved harmonic was discovered when the curve was shifted down and the neutral point was shifted to the inflection point at A4, 440 Hz. FIG. 1*c* shows the Fibratio 440 tuning where 440 Hz is the neutral intercept crossing point with 440 Hz also as the inflection point. The chart is as follows:

TABLE 5

| Note | Fibratio 440 Cents Offset |
|---|---|
| A0 | −29.8264 |
| A#0/Bb0 | −27.5642 |
| B0 | −25.4771 |
| C1 | −23.5525 |
| C#1/Db1 | −21.7783 |
| D1 | −20.1434 |
| D#1/Eb1 | −18.6378 |
| E1 | −17.2518 |
| F1 | −15.9766 |
| F#1/Gb1 | −14.804 |
| G1 | −13.7265 |
| G#1/Ab1 | −12.7369 |
| A1 | −11.7 |
| A#1/Bb1 | −10.7948 |
| B1 | −9.85337 |
| C2 | −8.99711 |
| C#2/Db2 | −8.21942 |
| D2 | −7.51412 |
| D#2/Eb2 | −6.87547 |
| E2 | −6.29818 |
| F2 | −5.77733 |
| F#2/Gb2 | −5.30839 |
| G2 | −4.88713 |
| G#2/Ab2 | −4.50967 |
| A2 | −4 |
| A#2/Bb2 | −3.67173 |
| B2 | −3.22738 |
| C3 | −2.83459 |
| C#3/Db3 | −2.48892 |

TABLE 5-continued

| Note | Fibratio 440 Cents Offset |
|---|---|
| D3 | −2.18634 |
| D#3/Eb3 | −1.92306 |
| E3 | −1.69563 |
| F3 | −1.50082 |
| F#3/Gb3 | −1.33569 |
| G3 | −1.19753 |
| G#3/Ab3 | −1.0838 |
| A3 | −0.99221 |
| A#3/Bb3 | −0.7707 |
| B3 | −0.58408 |
| C4 | −0.42912 |
| C#4/Db4 | −0.30286 |
| D4 | −0.20256 |
| D#4/Eb4 | −0.1257 |
| E4 | −0.06996 |
| F4 | −0.0332 |
| F#4/Gb4 | −0.01348 |
| G4 | −0.009 |
| G#4/Ab4 | −0.00452 |
| A4 | 0 |
| A#4/Bb4 | 0.019683 |
| B4 | 0.056443 |
| C5 | 0.112179 |
| C#5/Db5 | 0.189045 |
| D5 | 0.289348 |
| D#5/Eb5 | 0.415607 |
| E5 | 0.57056 |
| F5 | 0.75718 |
| F#5/Gb5 | 0.978696 |
| G5 | 1.07028 |
| G#5/Ab5 | 1.184012 |
| A5 | 1.322173 |
| A#5/Bb5 | 1.487299 |
| B5 | 1.68211 |
| C6 | 1.90954 |
| C#6/Db6 | 2.172819 |
| D6 | 2.475408 |
| D#6/Eb6 | 2.82107 |
| E6 | 3.213867 |
| F6 | 3.658213 |
| F#6/Gb6 | 4 |
| G6 | 4.496156 |

TABLE 5-continued

| Note | Fibratio 440 Cents Offset |
|---|---|
| G#6/Ab6 | 4.873615 |
| A6 | 5.294869 |
| A#6/Bb6 | 5.763813 |
| B6 | 6.284659 |
| C7 | 6.861952 |
| C#7/Db7 | 7.500599 |
| D7 | 8.205905 |
| D#7/Eb7 | 8.983598 |
| E7 | 9.839852 |
| F7 | 10.78133 |
| F#7/Gb7 | 11.81525 |
| G7 | 12.72341 |
| G#7/Ab7 | 13.71299 |
| A7 | 14.79052 |
| A#7/Bb7 | 15.96308 |
| B7 | 17.23827 |
| C8 | 18.62425 |

Figure 2A:
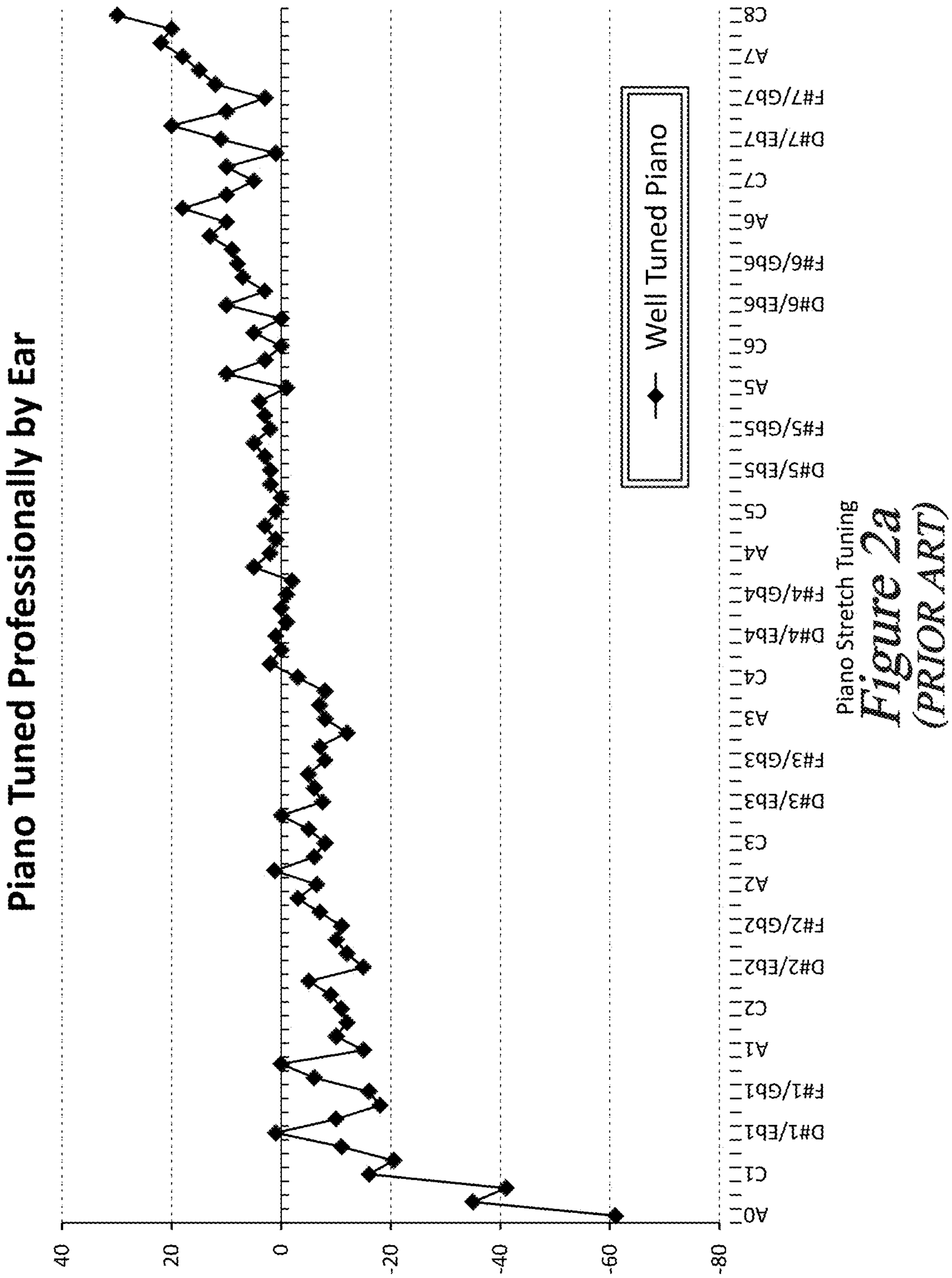
Figure 2a (PRIOR ART)
FIG. 2*a* is a graph of a PRIOR ART Piano Equal-Temperament Tuning.
Figure 2B:
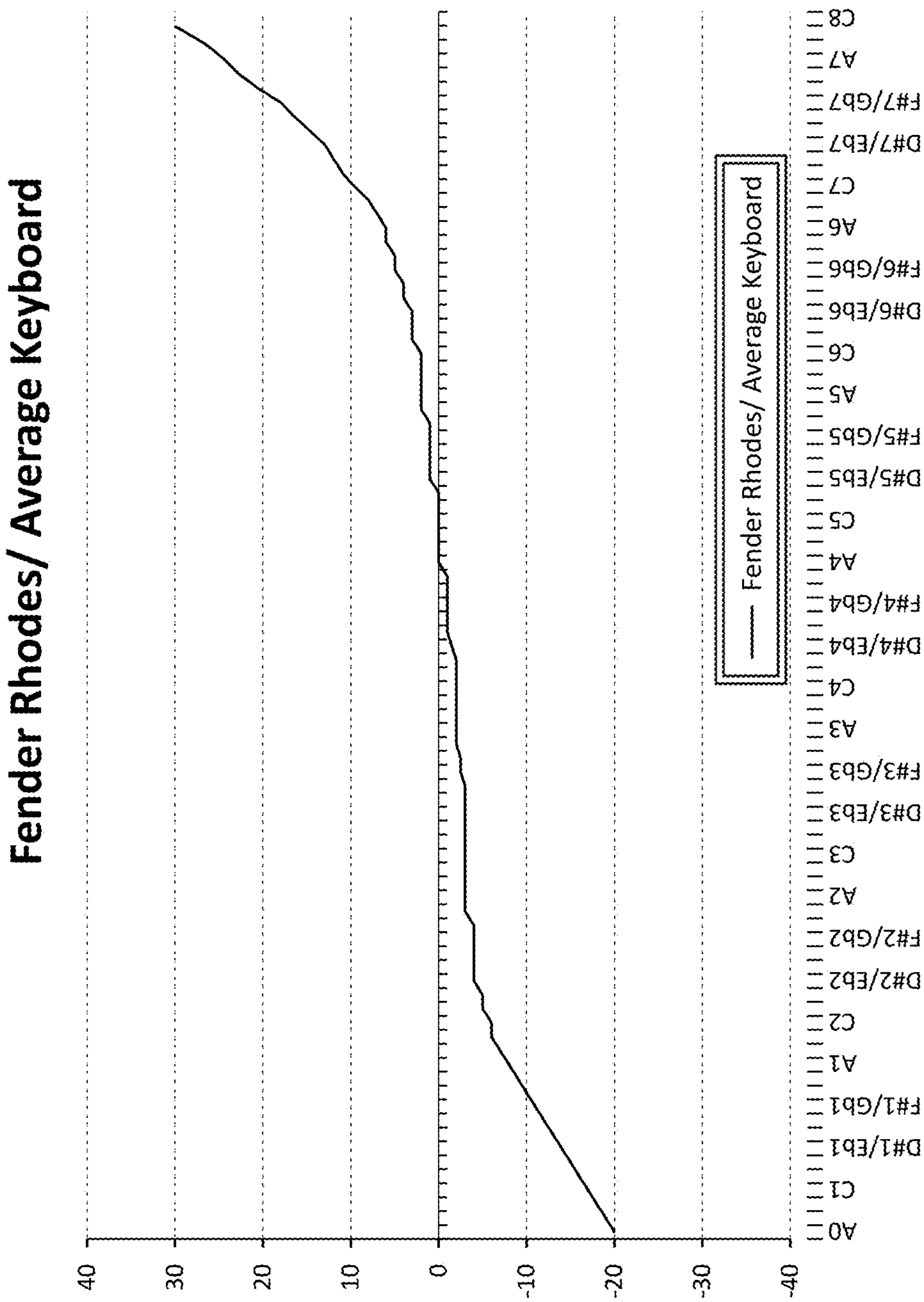
Figure 2b (PRIOR ART)
FIG. 2*b* is a graph of a PRIOR ART Fender step/straight segment tuning.
Figure 2C:
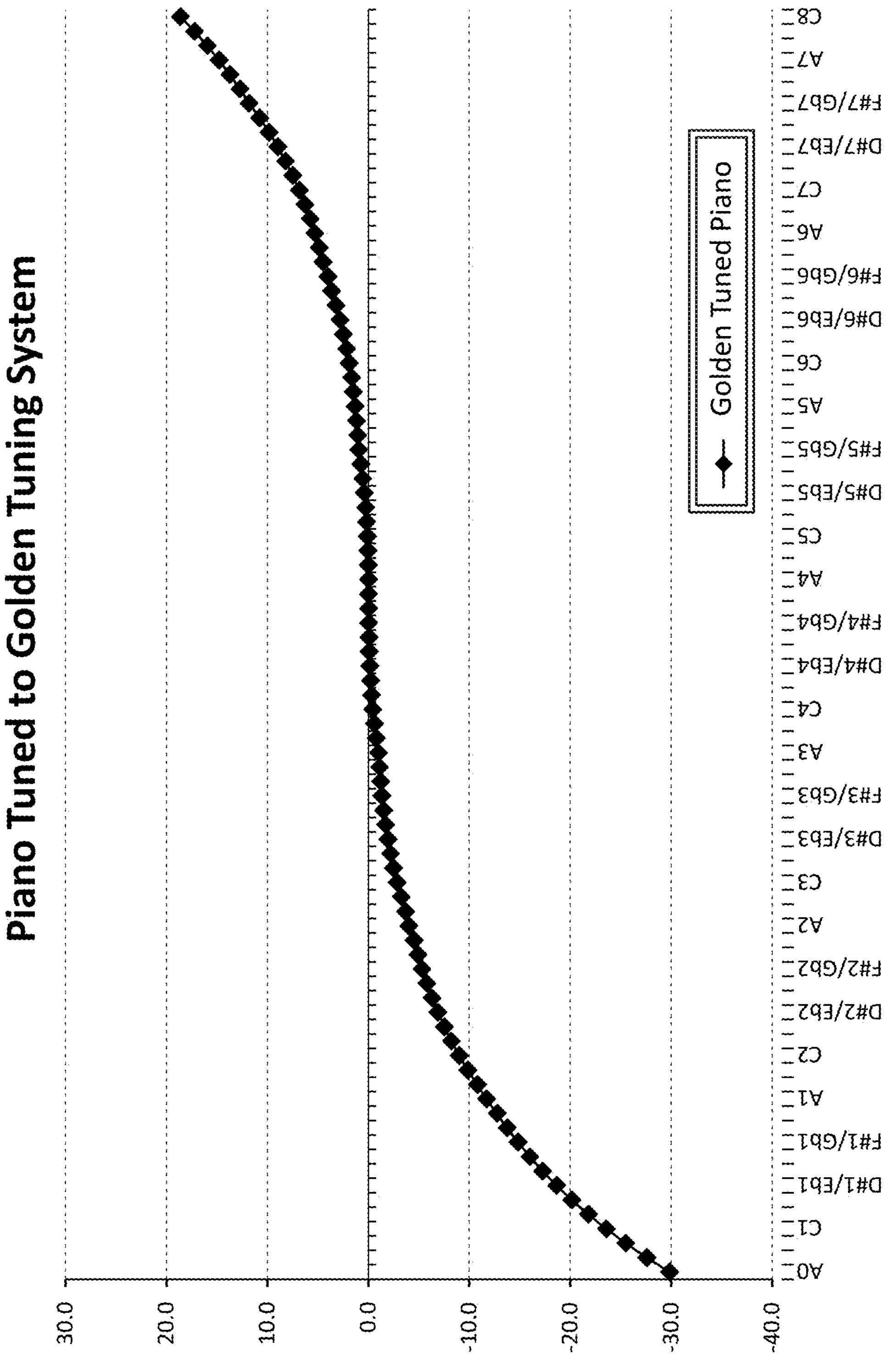
FIG. 2*c* is a graph of a Piano Fibratio Curve Tuning.

The closest comparisons of this type of tuning in the known prior art is in a well tuned piano that tunes to perceived harmonics, and the Railsback curve style of stretch adjustment of an electric Fender Rhodes piano taught in the Prior Art. The following chart compares the different frequencies achieved in Hertz, and FIGS. 2*a* and 2*b* provide a similar comparison.

TABLE 6

| Note 0 | Well Tuned Piano | Fender Rhodes/ Cent Change | Fibratio 440 Cents Offset Fibratio |
|---|---|---|---|
| A0 | −61 | −20 | −29.8264 |
| A#0/Bb0 | −35 | −19 | −27.5642 |
| B0 | −41 | −18 | −25.4771 |
| C1 | −16 | −17 | −23.5525 |
| C#1/Db1 | −20.5 | −16 | −21.7783 |
| D1 | −11 | −15 | −20.1434 |
| D#1/Eb1 | 1 | −14 | −18.6378 |
| E1 | −10 | −13 | −17.2518 |
| F1 | −18 | −12 | −15.9766 |
| F#1/Gb1 | −16 | −11 | −14.804 |
| G1 | −6 | −10 | −13.7265 |
| G#1/Ab1 | 0 | −9 | −12.7369 |
| A1 | −15 | −8 | −11.7 |
| A#1/Bb1 | −10 | −7 | −10.7948 |
| B1 | −12 | −6 | −9.85337 |
| C2 | −11 | −6 | −8.99711 |
| C#2/Db2 | −9 | −5 | −8.21942 |
| D2 | −5 | −5 | −7.51412 |
| D#2/Eb2 | −15 | −4 | −6.87547 |
| E2 | −12 | −4 | −6.29818 |
| F2 | −10 | −4 | −5.77733 |
| F#2/Gb2 | −11 | −4 | −5.30839 |
| G2 | −7 | −4 | −4.88713 |
| G#2/Ab2 | −3 | −3 | −4.50967 |
| A2 | −6.5 | −3 | −4 |
| A#2/Bb2 | 1.2 | −3 | −3.67173 |
| B2 | −6 | −3 | −3.22738 |
| C3 | −8 | −3 | −2.83459 |
| C#3/Db3 | −5 | −3 | −2.48892 |
| D3 | 0 | −3 | −2.18634 |
| D#3/Eb3 | −7.5 | −3 | −1.92306 |
| E3 | −6 | −3 | −1.69563 |
| F3 | −5 | −3 | −1.50082 |
| F#3/Gb3 | −8 | −2.5 | −1.33569 |
| G3 | −7 | −2.5 | −1.19753 |
| G#3/Ab3 | −12 | −2 | −1.0838 |
| A3 | −8 | −2 | −0.99221 |
| A#3/Bb3 | −7 | −2 | −0.7707 |
| B3 | −8 | −2 | −0.58408 |

TABLE 6-continued

| Note 0 | Well Tuned Piano | Fender Rhodes/ Cent Change | Fibratio 440 Cents Offset Fibratio |
|---|---|---|---|
| C4 | −3 | −2 | −0.42912 |
| C#4/Db4 | 2 | −2 | −0.30286 |
| D4 | 0 | −2 | −0.20256 |
| D#4/Eb4 | 1 | −1.5 | −0.1257 |
| E4 | −1 | −1 | −0.06996 |
| F4 | 0 | −1 | −0.0332 |
| F#4/Gb4 | −1 | −1 | −0.01348 |
| G4 | −2 | −1 | −0.009 |
| G#4/Ab4 | 5 | −1 | −0.00452 |
| A4 | 2 | 0 | 0 |
| A#4/Bb4 | 1 | 0 | 0.019683 |
| B4 | 3 | 0 | 0.056443 |
| C5 | 1 | 0 | 0.112179 |
| C#5/Db5 | 0 | 0 | 0.189045 |
| D5 | 2 | 0 | 0.289348 |
| D#5/Eb5 | 2 | 1 | 0.415607 |
| E5 | 3 | 1 | 0.57056 |
| F5 | 5 | 1 | 0.75718 |
| F#5/Gb5 | 2 | 1 | 0.978696 |
| G5 | 3 | 1 | 1.07028 |
| G#5/Ab5 | 4 | 2 | 1.184012 |
| A5 | −1 | 2 | 1.322173 |
| A#5/Bb5 | 10 | 2 | 1.487299 |
| B5 | 3 | 2 | 1.68211 |
| C6 | 0 | 2 | 1.90954 |
| C#6/Db6 | 5 | 3 | 2.172819 |
| D6 | 0 | 3 | 2.475408 |
| D#6/Eb6 | 10 | 3 | 2.82107 |
| E6 | 3 | 4 | 3.213867 |
| F6 | 7 | 4 | 3.658213 |
| F#6/Gb6 | 8 | 5 | 4 |
| G6 | 9 | 5 | 4.496156 |
| G#6/Ab6 | 13 | 6 | 4.873615 |
| A6 | 10 | 6 | 5.294869 |
| A#6/Bb6 | 18 | 7 | 5.763813 |
| B6 | 10 | 8 | 6.284659 |
| C7 | 5 | 10 | 6.861952 |
| C#7/Db7 | 10 | 11 | 7.500599 |
| D7 | 1 | 12 | 8.205905 |
| D#7/Eb7 | 11 | 13 | 8.983598 |
| E7 | 20 | 15 | 9.839852 |
| F7 | 10 | 17 | 10.78133 |
| F#7/Gb7 | 3 | 19 | 11.81525 |
| G7 | 12 | 21 | 12.72341 |
| G#7/Ab7 | 15 | 23 | 13.71299 |
| A7 | 18 | 25 | 14.79052 |
| A#7/Bb7 | 22 | 27 | 15.96308 |
| B7 | 20 | 30 | 17.23827 |
| C8 | 30 | 0 | 18.62425 |

As noted by FIG. 2*a* for the well tuned piano, ear tuning results in harsh steps between the notes spiking in both sharp and flat directions with a high amount of variability in the tuning. Specifically, note the counter trend segments surrounding A4. This provides a stark contrast to the harmonious curve of the fibratio tuning shown in FIG. 2*c*.

Next, we can look at the approximation of a Railsback curve in FIG. 2*b* in the Fender Rhodes piano. Several items immediately become apparent, 1) the incredible sharpness (+30) on the right side of the scale for the Rhodes; 2) the low inflection point at C4, and 3) note the linear segments of cent adjustment taught in the stretch tuning of the Fender Rhodes Piano, 4) the linear line in the graph of the linear progression of cents dropping from A0 at −20 through each integer to A1 having a −8 adjustment; 5) in the table and FIG. 2*b*, note the linear segments of constant adjustment such as where 5 notes are adjusted at a positive 1 cent and then five notes are adjusted at a positive 2 cents. These types of linear or straight segment adjustments also create problems across the tuning.

Now that we understand how different the curvature of the Fibratio Tuning is from the prior art tunings, we can look to understand how to achieve this with individual instrument tunings.

Figure 3A:
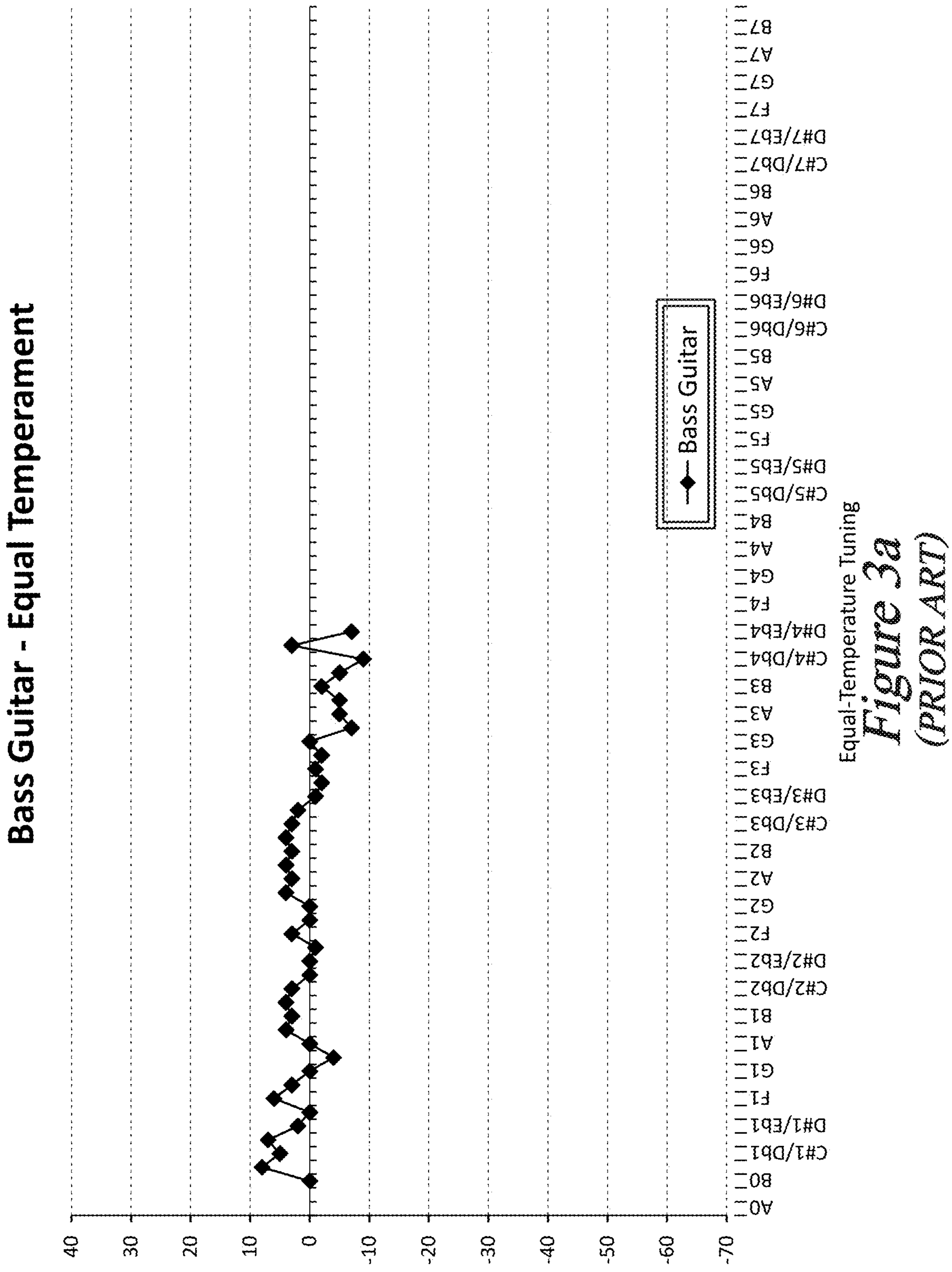
Figure 3a (PRIOR ART)
FIG. 3*a* is a graph of a PRIOR ART Equal-Temperament Tuning.
Figure 3B:
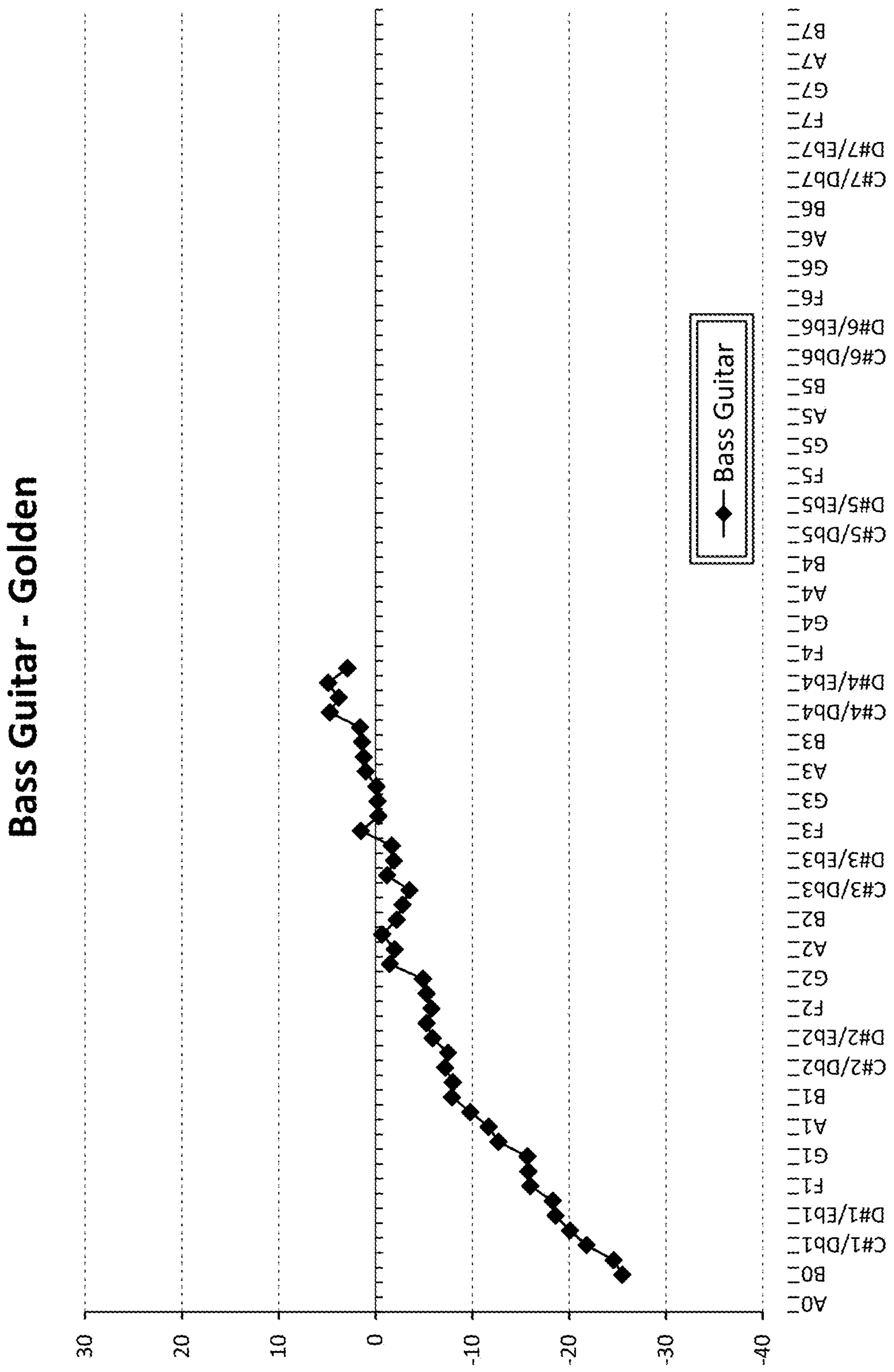
FIG. 3*b* is a graph of a Fibratio Tuning.

FIGS. 3*a* and 3*b* provide a bass guitar tuning comparison.

TABLE 7

| Gldn Bass Notes String | Open String Diff from Std | New Open | Cents offset | 12th Fret (Oct) Diff from Std | New Oct | Cents off | Std Hz Bass Notes String | Open | Octave |
|---|---|---|---|---|---|---|---|---|---|
| Low B0 | −0.378 | 30.49 | −21.30 | −0.202 | 61.53 | −5.68 | Low B | 30.868 | 61.736 |
| Low El | −0.310 | 40.89 | −13.08 | −0.101 | 82.31 | −2.13 | Low E | 41.204 | 82.407 |
| A1 | −0.2427 | 54.76 | −7.66 | 0.000 | 110.00 | 0.00 | A | 55 | 110.000 |
| D2 | −0.142 | 73.27 | −3.34 | 0.169 | 147.00 | 1.99 | D | 73.416 | 146.830 |
| G2 | −0.040 | 97.96 | −0.71 | 0.337 | 196.34 | 2.97 | G | 97.999 | 196.000 |

Figure 4A:
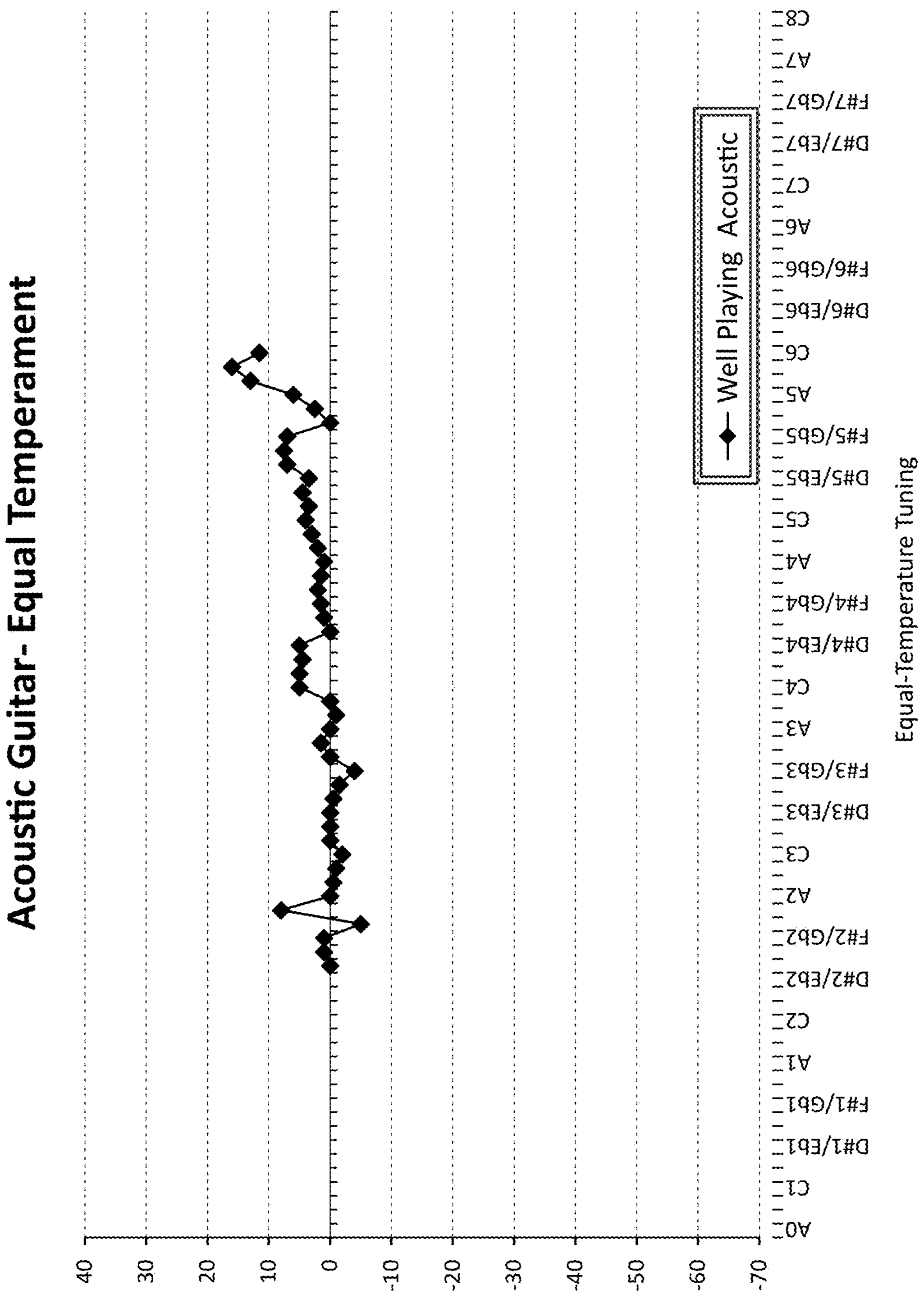
Figure 4a (PRIOR ART)
FIG. 4*a* is a graph of a PRIOR ART Equal-Temperament Tuning.
Figure 4B:
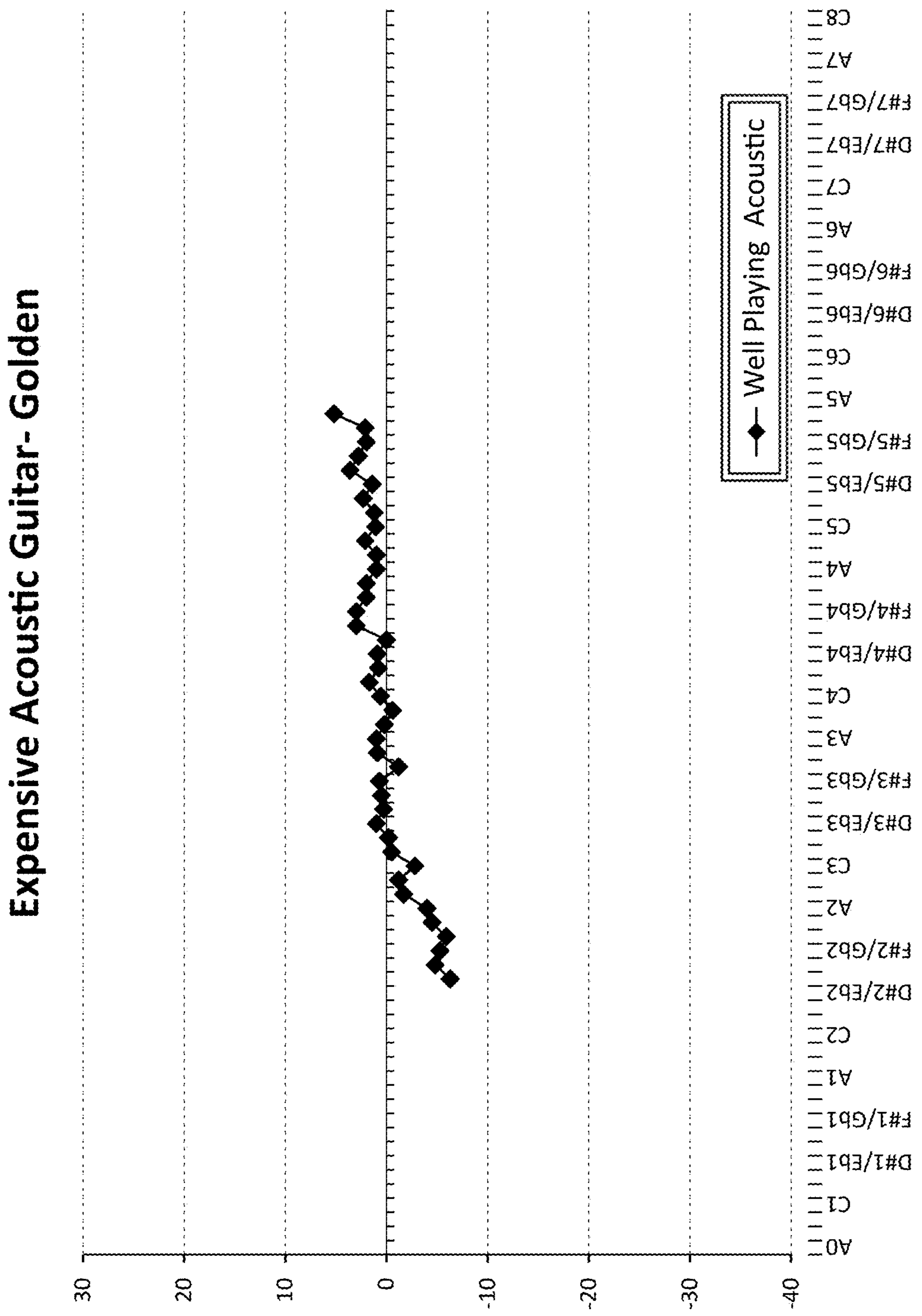
FIG. 4*b* is a graph of a Fibratio Tuning.
Figure 5A:
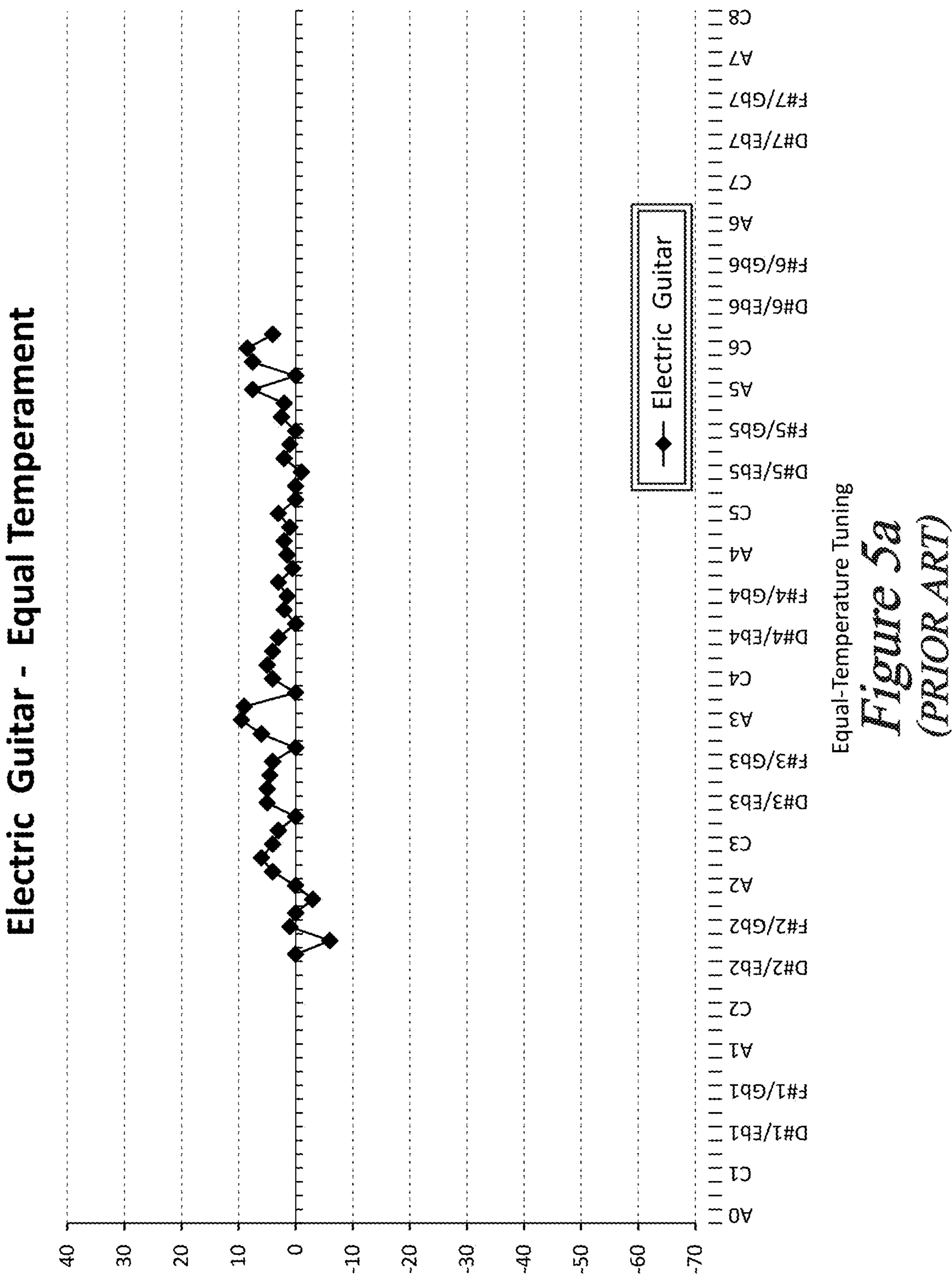
Figure 5a (PRIOR ART)
FIG. 5*a* is a graph of a PRIOR ART Equal-Temperament Tuning.
Figure 5B:
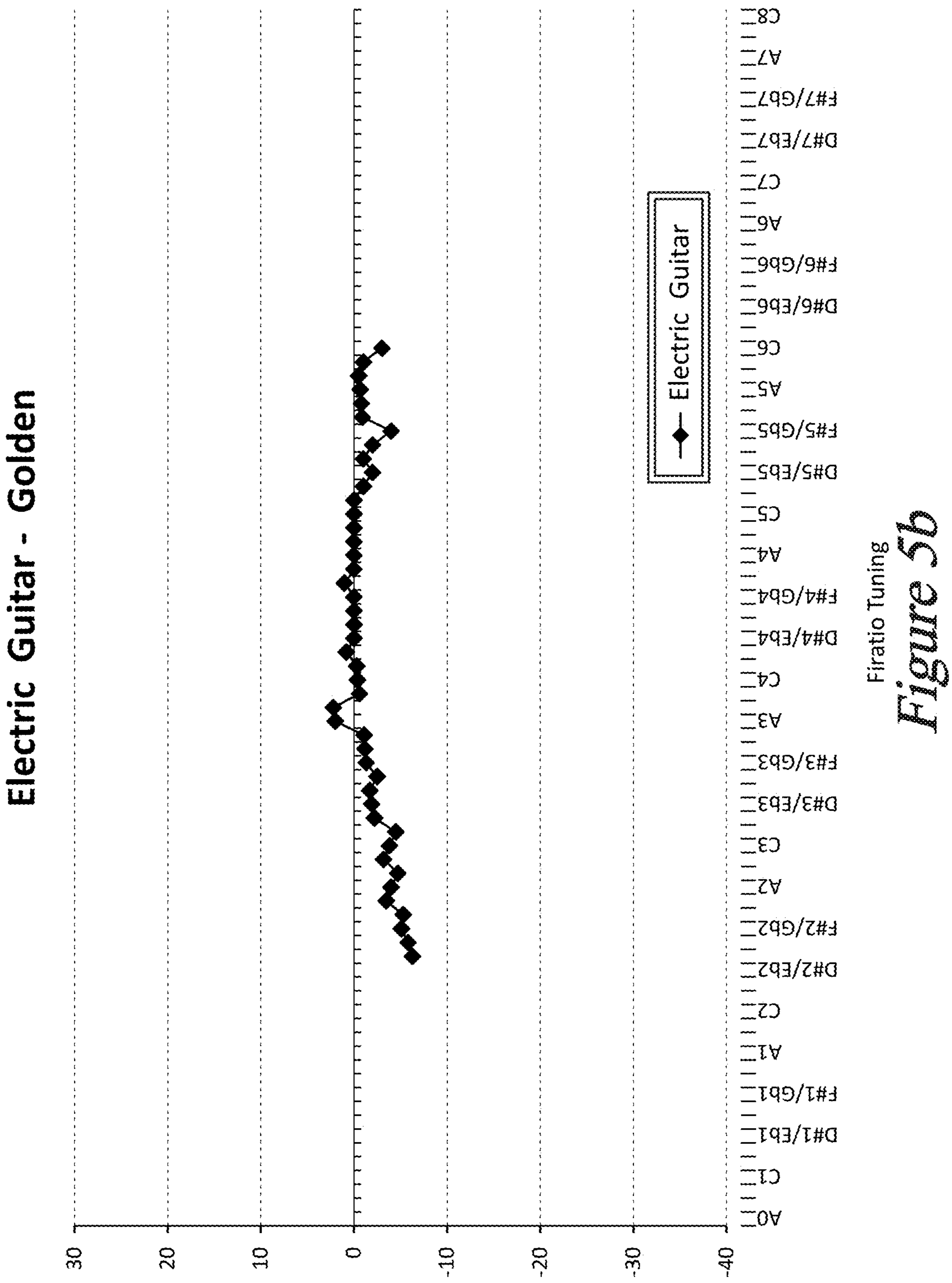
FIG. 5*b* is a graph of a Fibratio Tuning.

FIGS. 4*a* and 4*b* provide an acoustic guitar tuning comparison and FIGS. 5*a* and 5*b* provide an electric guitar tuning comparison.

TABLE 8

| Gldn Gtr Nts String | Open String Diff from Std | New Open | Cents offset | 12th Fret (Octave) Diff from Standard | New Octave | Cents off | Std Hz Gtr Nts String | Open | Octave |
|---|---|---|---|---|---|---|---|---|---|
| Low E2 | −0.101 | 82.31 | −2.13 | 0.236 | 165.05 | 2.48 | Low E | 82.407 | 164.810 |
| A2 | 0 | 110.00 | 0.00 | 0.405 | 220.40 | 3.18 | A | 110.000 | 220.000 |
| D3 | 0.169 | 147.00 | 1.99 | 0.674 | 294.34 | 3.97 | D | 146.830 | 293.670 |
| G3 | 0.337 | 196.34 | 2.97 | 0.944 | 392.94 | 4.16 | G | 196.000 | 392.000 |
| B3 | 0.512 | 247.45 | 3.59 | 1.227 | 495.11 | 4.30 | B | 246.940 | 493.880 |
| E4 | 0.782 | 330.41 | 4.10 | 1.665 | 660.93 | 4.37 | E | 329.630 | 659.260 |

Figure 6A:
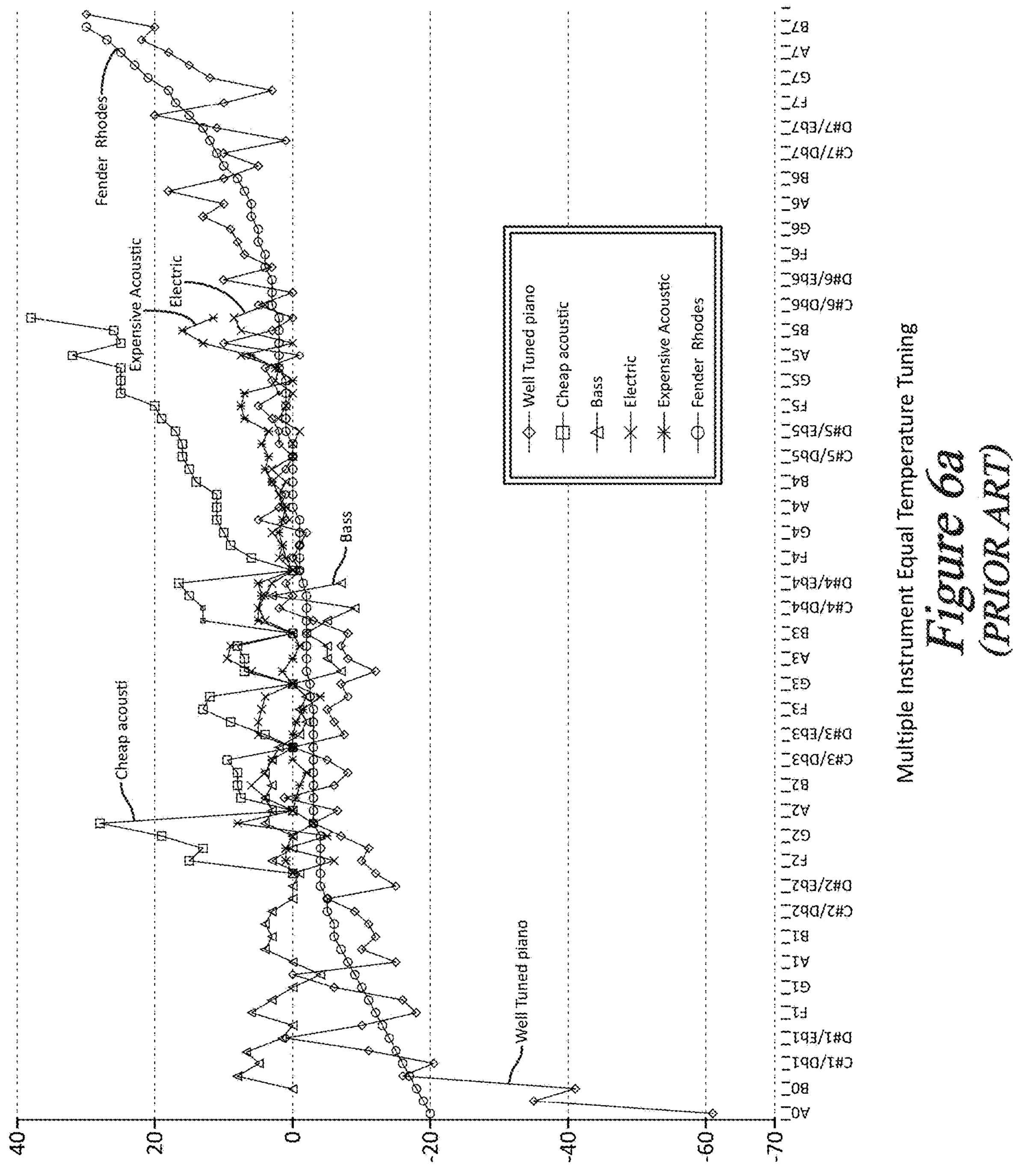
Figure 6a (PRIOR ART)
FIG. 6*a* is a graph of a PRIOR ART-Multiple Instrument Equal Temperament Tuning.
Figure 6B:
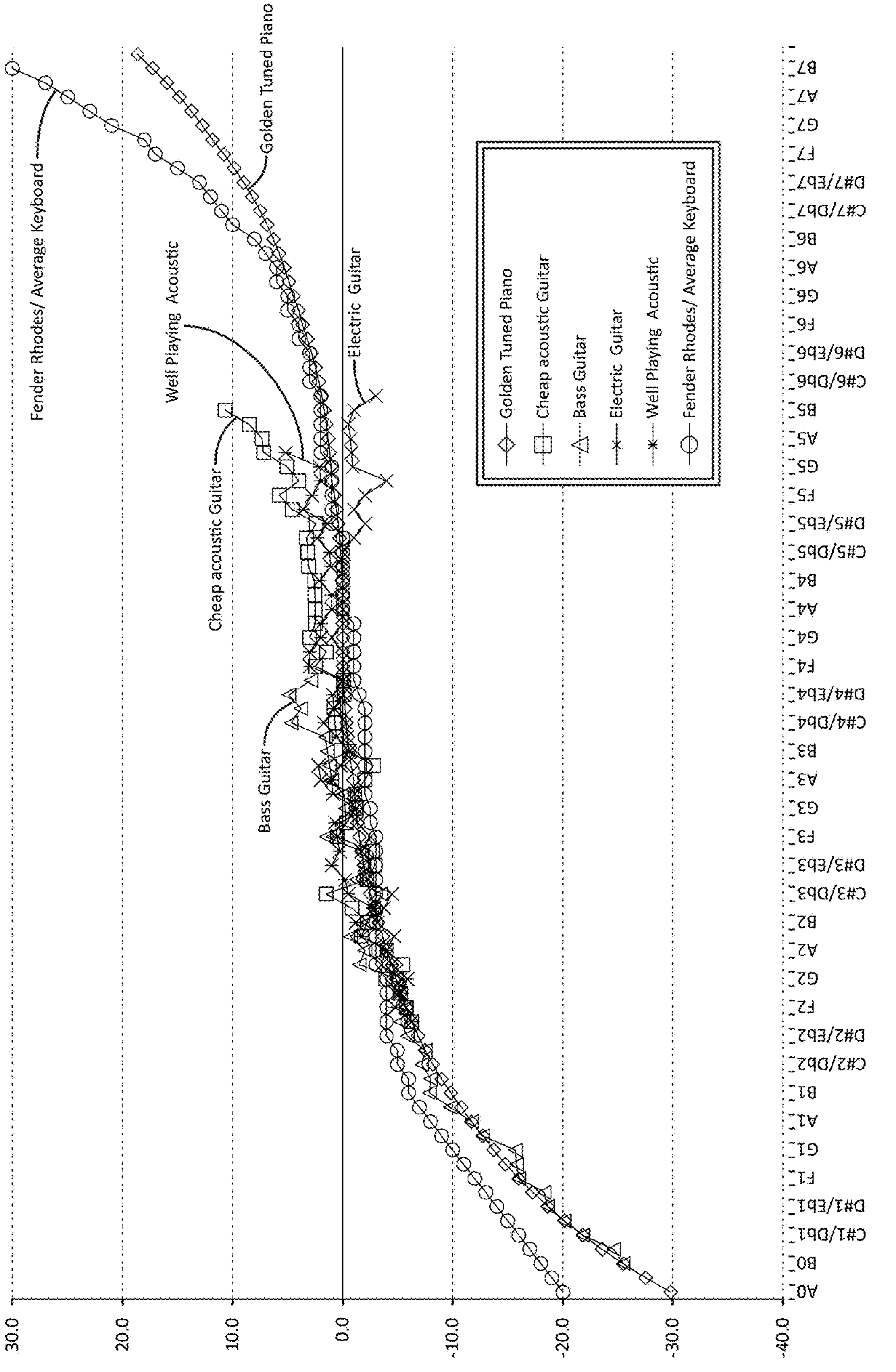
FIG. 6*b* is a graph of a Fibratio 440 Multiple Instrument Tuning.

Finally, we can note the comparison in FIGS. 6*a* and 6*b* of the change in tuning provide by the fibratio 440 system in comparison to the prior art equal temperament tuning.

TABLE 9

| Note | Fibratio 440 Note offset Theory | Fibratio Tuned Piano | Bass Guitar | Electric Guitar | Well Playing Acoustic | Fender Rhodes/ Average Keyboard | Cheap acoustic Guitar |
|---|---|---|---|---|---|---|---|
| A0 | −29.8264 | −29.8264 | | | | −20 | |
| A#0/Bb0 | −27.5642 | −27.5642 | | | | −19 | |
| B0 | −25.4771 | −25.4771 | −25.5 | | | −18 | |
| C1 | −23.5525 | −23.5525 | −24.6 | | | −17 | |
| C#1/Db1 | −21.7783 | −21.7783 | −21.8 | | | −16 | |
| D1 | −20.1434 | −20.1434 | −20.1 | | | −15 | |
| D#1/Eb1 | −18.6378 | −18.6378 | −18.6 | | | −14 | |
| E1 | −17.2518 | −17.2518 | −18.3 | | | −13 | |
| F1 | −15.9766 | −15.9766 | −16 | | | −12 | |
| F#1/Gb1 | −14.804 | −14.804 | −15.8 | | | −11 | |
| G1 | −13.7265 | −13.7265 | −15.7 | | | −10 | |
| G#1/Ab1 | −12.7369 | −12.7369 | −12.7 | | | −9 | |
| A1 | −11.7 | −11.7 | −11.7 | | | −8 | |
| A#1/Bb1 | −10.7948 | −10.7948 | −9.8 | | | −7 | |
| B1 | −9.85337 | −9.85337 | −7.9 | | | −6 | |
| C2 | −8.99711 | −8.99711 | −8 | | | −6 | |
| C#2/Db2 | −8.21942 | −8.21942 | −7.2 | | | −5 | |
| D2 | −7.51412 | −7.51412 | −7.5 | | | −5 | |
| D#2/Eb2 | −6.87547 | −6.87547 | −5.9 | | | −4 | |
| E2 | −6.29818 | −6.29818 | −5.3 | −6.3 | −6.3 | −4 | −6.29818 |
| F2 | −5.77733 | −5.77733 | −5.8 | −5.8 | −4.8 | −4 | −5.77733 |
| F#2/Gb2 | −5.30839 | −5.30839 | −5.3 | −5.1 | −5.3 | −4 | −5.30839 |
| G2 | −4.88713 | −4.88713 | −4.9 | −5.3 | −5.9 | −4 | −3.88713 |

TABLE 9-continued

| Note | Fibratio 440 Note offset Theory | Fibratio Tuned Piano | Bass Guitar | Electric Guitar | Well Playing Acoustic | Fender Rhodes/ Average Keyboard | Cheap acoustic Guitar |
|---|---|---|---|---|---|---|---|
| G#2/Ab2 | −4.50967 | −4.50967 | −1.5 | −3.5 | −4.5 | −3 | −5.50967 |
| A2 | −4 | −4 | −2 | −4 | −4 | −3 | −4 |
| A#2/Bb2 | −3.67173 | −3.67173 | −0.7 | −4.7 | −1.7 | −3 | −1.67173 |
| B2 | −3.22738 | −3.22738 | −2.2 | −3.2 | −1.2 | −3 | −2.22738 |
| C3 | −2.83459 | −2.83459 | −2.8 | −3.8 | −2.8 | −3 | −0.83459 |
| C#3/Db3 | −2.48892 | −2.48892 | −3.5 | −4.5 | −0.5 | −3 | 1.511076 |
| D3 | −2.18634 | −2.18634 | −1.2 | −2.2 | −0.2 | −3 | −2.18634 |
| D#3/Eb3 | −1.92306 | −1.92306 | −1.9 | −1.9 | 1 | −3 | −2.92306 |
| E3 | −1.69563 | −1.69563 | −1.7 | −1.7 | 0.3 | −3 | −2.69563 |
| F3 | −1.50082 | −1.50082 | −1.5 | −2.5 | 0.5 | −3 | 0.499184 |
| F#3/Gb3 | −1.33569 | −1.33569 | −0.3 | −1.3 | 0.7 | −2.5 | −0.33569 |
| G3 | −1.19753 | −1.19753 | −0.2 | −1.2 | −1.2 | −2.5 | −1.19753 |
| G#3/Ab3 | −1.0838 | −1.0838 | −0.1 | −1.1 | 0.9 | −2 | −1.0838 |
| A3 | −0.99221 | −0.99221 | 1 | 2 | 1 | −2 | −1.99221 |
| A#3/Bb3 | −0.7707 | −0.7707 | 1.2 | 2.2 | 0.2 | −2 | −2.7707 |
| B3 | −0.58408 | −0.58408 | 1.4 | −0.6 | −0.6 | −2 | −0.58408 |
| C4 | −0.42912 | −0.42912 | 1.6 | −0.4 | 0.6 | −2 | 0.570876 |
| C#4/Db4 | −0.30286 | −0.30286 | 4.7 | −0.3 | 1.7 | −2 | 0.697136 |
| D4 | −0.20256 | −0.20256 | 3.8 | 0.8 | 0.8 | −2 | 0.797439 |
| D#4/Eb4 | −0.1257 | −0.1257 | 4.9 | 0 | 0.9 | −1.5 | −0.1257 |
| E4 | −0.06996 | −0.06996 | 2.9 | 0 | 0 | −1 | −0.06996 |
| F4 | −0.0332 | −0.0332 | | 0 | 3 | −1 | 2.4668 |
| F#4/Gb4 | −0.01348 | −0.01348 | | 0 | 3 | −1 | 1.48652 |
| G4 | −0.009 | −0.009 | | 1 | 2 | −1 | 2.991001 |
| G#4/Ab4 | −0.00452 | −0.00452 | | 0 | 2 | −1 | 2.495482 |
| A4 | 0 | 0 | | 0 | 1 | 0 | 2.5 |
| A#4/Bb4 | 0.019683 | 0.019683 | | 0 | 1 | 0 | 2.519683 |
| B4 | 0.056443 | 0.056443 | | 0 | 2.1 | 0 | 2.556443 |
| C5 | 0.112179 | 0.112179 | | 0 | 1.1 | 0 | 3.112179 |
| C#5/Db5 | 0.189045 | 0.189045 | | 0 | 1.2 | 0 | 3.189045 |
| D5 | 0.289348 | 0.289348 | | −1 | 2.3 | 0 | 3.289348 |
| D#5/Eb5 | 0.415607 | 0.415607 | | −2 | 1.4 | 1 | 2.415607 |
| E5 | 0.57056 | 0.57056 | | −1 | 3.6 | 1 | 4.57056 |
| F5 | 0.75718 | 0.75718 | | −2 | 2.8 | 1 | 5.75718 |
| F#5/Gb5 | 0.978696 | 0.978696 | | −4 | 2 | 1 | 3.978696 |
| G5 | 1.07028 | 1.07028 | | −0.9 | 2.1 | 1 | 5.07028 |
| G#5/Ab5 | 1.184012 | 1.184012 | | −0.8 | 5.2 | 2 | 7.184012 |
| A5 | 1.322173 | 1.322173 | | −0.7 | | 2 | 7.322173 |
| A#5/Bb5 | 1.487299 | 1.487299 | | −0.5 | | 2 | 8.487299 |
| B5 | 1.68211 | 1.68211 | | −1 | | 2 | 10.68211 |
| C6 | 1.90954 | 1.90954 | | −3 | | 2 | |
| C#6/Db6 | 2.172819 | 2.172819 | | | | 3 | |
| D6 | 2.475408 | 2.475408 | | | | 3 | |
| D#6/Eb6 | 2.82107 | 2.82107 | | | | 3 | |
| E6 | 3.213867 | 3.213867 | | | | 4 | |
| F6 | 3.658213 | 3.658213 | | | | 4 | |
| F#6/Gb6 | 4 | 4 | | | | 5 | |
| G6 | 4.496156 | 4.496156 | | | | 5 | |
| G#6/Ab6 | 4.873615 | 4.873615 | | | | 6 | |
| A6 | 5.294869 | 5.294869 | | | | 6 | |
| A#6/Bb6 | 5.763813 | 5.763813 | | | | 7 | |
| B6 | 6.284659 | 6.284659 | | | | 8 | |
| C7 | 6.861952 | 6.861952 | | | | 10 | |
| C#7/Db7 | 7.500599 | 7.500599 | | | | 11 | |
| D7 | 8.205905 | 8.205905 | | | | 12 | |
| D#7/Eb7 | 8.983598 | 8.983598 | | | | 13 | |
| E7 | 9.839852 | 9.839852 | | | | 15 | |
| F7 | 10.78133 | 10.78133 | | | | 17 | |
| F#7/Gb7 | 11.81525 | 11.81525 | | | | 18 | |
| G7 | 12.72341 | 12.72341 | | | | 21 | |
| G#7/Ab7 | 13.71299 | 13.71299 | | | | 23 | |
| A7 | 14.79052 | 14.79052 | | | | 25 | |
| A#7/Bb7 | 15.96308 | 15.96308 | | | | 27 | |
| B7 | 17.23827 | 17.23827 | | | | | |
| C8 | 18.62425 | 18.62425 | | | | | |

Additional instrument tunings for easy reference. First a guitar:

TABLE 10

| Fibratio Guitar Notes String/Note | Fibratio Deviation from equal temperament |
|---|---|
| Low E2 | −6.3 |
| A2 | −4.0 |
| D3 | −2.2 |
| G3 | −1.2 |
| B3 | −0.6 |
| E4 | −0.1 |

Bass Tunings:

TABLE 11

| Fibratio Bass Notes String/Note | Fibratio Deviation from equal temperament |
|---|---|
| Low B0 | −25.5 |
| Low E1 | −17.3 |
| A1 | −11.7 |
| D2 | −7.5 |
| G2 | −4.9 |

Mandolin Tunings:

TABLE 12

| Fibratio Mandolin Notes String/Note | Fibratio Deviation from equal temperament |
|---|---|
| G3 | −1.2 |
| D4 | −0.2 |
| A4 | 0.0 |
| E5 | 0.6 |

Ukelele Tunings:

TABLE 13

| Fibratio Uke Notes String/Note | Fibratio Deviation from equal temperament |
|---|---|
| High G4 | 0.0 |
| C4 | −0.4 |
| E4 | −0.1 |
| A4 | 0.0 |

And variable tuning for DADGAD on guitar:

TABLE 14

| Fibratio Guitar DADGAD String/Note | Fibratio Deviation from equal temperament |
|---|---|
| $D_2$ | −7.5 |
| A2 | −4.0 |
| D3 | −2.2 |
| G3 | −1.2 |
| $A_3$ | −1.0 |
| $D_4$ | −0.2 |

And also a CAPO 5 on the guitar:

TABLE 15

| Fibratio Guitar CAPO 5 String/Note | Fibratio Deviation from equal temperament |
|---|---|
| A2 | −4.0 |
| D3 | −2.2 |
| G3 | −1.2 |
| $C_4$ | −0.4 |
| $E_4$ | −0.1 |
| $A_5$ | 1.3 |

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word ‘method’ in the preamble of the claims and the use of the ‘ing’ tense of the active word. Method claims should not be interpreted to have particular steps in a particular order unless the claim element specifically refers to a previous element, a previous action, or the result of a previous action. Apparatus claims may be recognized by the use of the word ‘apparatus’ in the preamble of the claim and should not be interpreted to have ‘means plus function language’ unless the word ‘means’ is specifically used in the claim element. The words ‘defining,’ ‘having,’ or ‘including’ should be interpreted as open ended claim language that allows additional elements or structures. Finally, where the claims recite “a” or “a first” element of the equivalent thereof, such claims should be understood to include incorporation of one or more such elements, neither requiring nor excluding two or more such elements.

What is claimed is:

1. A tuning method for tuning a musical instrument offset from an equal temperament note having an equal temperament frequency following diatomic half steps in an octave having an octave base note, the tuning system comprising:
- selecting a fibratio inflection note and a fibratio neutral crossing note;
- setting the fibratio neutral crossing note to an equal temperament frequency;
- tuning the musical instrument to a fibratio note offset from the fibratio neutral crossing note following a fibratio spiral including a sharp adjustment at frequencies above the fibratio inflection note and flat adjustment below the fibratio inflection note.

2. The tuning of claim 1, wherein the inflection note is at four hundred and forty Hertz.

3. The tuning of claim 1, wherein the neutral crossing note is at four hundred and forty Hertz.

4. The tuning of claim 1, wherein both the inflection note and the neutral crossing note are at four hundred and forty Hertz.

5. The tuning of claim 1, wherein the neutral crossing note is at one hundred and ten Hertz.

6. The tuning of claim 2, wherein the neutral crossing note is at one hundred and ten Hertz.

* * * * *